(12) United States Patent
Ohki

(10) Patent No.: US 6,404,913 B1
(45) Date of Patent: Jun. 11, 2002

(54) IMAGE SYNTHESIZING APPARATUS AND METHOD, POSITION DETECTING APPARATUS AND METHOD, AND SUPPLY MEDIUM

(75) Inventor: Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/178,092

(22) Filed: Oct. 23, 1998

Related U.S. Application Data

(63) Continuation of application No. PCT/JP98/01053, filed on Mar. 13, 1998.

(30) Foreign Application Priority Data

Mar. 14, 1997 (JP) ............................................... 9-060541

(51) Int. Cl.⁷ ............................. G06K 9/00; G06K 9/36; G06K 9/32; G06T 15/40
(52) U.S. Cl. ...................... 382/154; 382/284; 382/295; 345/422
(58) Field of Search ................................. 382/154, 293, 382/295, 296, 297, 284; 345/418, 419, 422, 427, 437, 438, 113, 114, 115

(56) References Cited

U.S. PATENT DOCUMENTS

| 5,727,093 A | * | 3/1998 | Uchiyama et al. | ........... 382/294 |
| 5,978,081 A | * | 11/1999 | Michael et al. | ........... 356/243.1 |

FOREIGN PATENT DOCUMENTS

| EP | 0735512 A2 | * 10/1996 | ........... G06T/15/10 |
| JP | 06-028449 | 2/1994 | ........... G06F/15/62 |
| JP | 8-101924 | 4/1996 | ........... G06T/15/00 |

OTHER PUBLICATIONS

Hidetoshi Nagano, Study on Information Tracking Technique (In Japanese):, pp. 228–233, Papers from Sony Research Forum, 1996, Feb. 1, 1997.

Yuji Nakanishi, Moving Picture Synthesizing System for Combining a Frame and CG Image Based on Characteristic Point in the Image. (in Japanese):, The Journal of the Institute of Image Information and Television Engineers, vol. 51, No. 7, Jul. 20, 1997, pp. 1086–1095.

* cited by examiner

Primary Examiner—Amelia M. Au
Assistant Examiner—Mehrdad Dastouri
(74) Attorney, Agent, or Firm—Bell, Boyd & Lloyd LLC

(57) ABSTRACT

When a GC (i.e., computer graphics) image is synthesized with an actual photographic image (dynamic image), it occurs that the synthesized image appears unnatural. An image pickup section 2 picks up a plate 1 while moving. When synthesizing a ball formed through CG with a continuous image picked up by the image pickup section 2, how 12 patterns (in the portion enclosed by a frame 21) Aj (j=1 . . . , 12) present a ball 5 are transferred in the continuous image picked up by the image pickup section 2 is shown by a rotational transform function and a rectilinear transform function to obtain the synthesis position of the projected image of the ball 5 in each image by using the rotational transform function and rectilinear transform function.

5 Claims, 22 Drawing Sheets

IMAGE SYNTHESIZING APPARATUS AND METHOD, POSITION DETECTING APPARATUS AND METHOD, AND SUPPLY MEDIUM

This application is a continuation of PCT/JP98/01053 filed Mar. 13, 1998.

TECHNICAL FIELD

The present invention relates to image synthesizing apparatus and method, position detecting apparatus and method, and a supply medium, particularly to image synthesizing apparatus and method, position detecting apparatus and method, and a supply medium for making it possible that the projected image of a predetermined object seems to be natural in continuous photographic images by synthesizing the projected image of the predetermined object with a plurality of continuous photographic images.

BACKGROUND ART

Because the computer graphics (CG) art has been advanced in recent years, it is possible to form a real image almost same as an actually photographed image (taken on the spot) though;the real image is artificially formed. In this case, the processing is frequently performed in which a predetermined object is continuously photographed (as a dynamic image) by a video camera and then, the CG image of the predetermined object is synthesized every image taken on the spot.

FIG. 1 shows a conventional image synthesizing method. In this case, it is assumed that an existent plate 1 is picked up by an image pickup section 2 and balls 5 and 6 formed through CG are synthesized with the image of the plate 1 so that the balls 5 and 6 seem to be stationary. In this case, the plate 1 on which patterns are drawn is first actually picked up by an image pickup section 2. In this case, the i-th pattern formed on the plate 1 is assumed as ai. In this case, symbol i denotes an integer and also an identification number attached to each pattern ai. The patterns ai are different from each other in color and shape and therefore, they can be distinguished between them. The image pickup section 2 uses a stereophonic video camera constituted with a main video camera and a sub-video camera and is constituted so that three-dimensional information can be obtained from the parallax between an image picked up by the main video camera and an image picked up by the sub-video camera. The plate 1 is picked up while moving the image pickup section 2.

In this case, the time for the image pickup section 2 to start pickup is assumed as a first time and a predetermined time after the first time in the pickup time is assumed as a second time. FIG. 1 shows the image pickup section 2 at the first time and the second time.

As shown in FIG. 2, a frame image $1A_1$ obtained by picking up the plate 1 from a predetermined angle is obtained from the image pickup section 2 at the first time. Similarly, as shown in FIG. 3, a frame image $1A_2$ different from the frame image $1A_1$ obtained at the first time is obtained at the second time.

Then, as shown in FIG. 4, projected images $5A_1$ and $6B_1$ of the balls 5 and 6 are synthesized with the image (image in FIG. 2) $1A_1$ picked up by the image pickup section 2 at the first time. Then, as shown in FIG. 5, projected images $5A_2$ and $6B_2$ of the balls 5 and 6 are synthesized with the image (image in FIG. 3) $1A_2$ picked up by the image pickup section 2 at (the second time at positions where the balls 5 and 6 seem to be stationary on the plate 1.

In this case, a method of synthesizing the balls 5 and 6 formed through CG so that they seem to be stationary on the plate 1 is described below by referring to FIGS. 6 and 7.

Though positions for finally synthesizing projected images 5A and 6B are on the two-dimensional images $1A_1$ and $1A_2$, the synthesis positions are easily understood by considering them in a three-dimensional space. Therefore, three-dimensional data (coordinates) is restored from a two-dimensional frame image. Because the frame image is obtained by the stereophonic video camera, the above restoration is realized.

That is, as shown in FIG. 6, three-dimensional coordinates are assumed in which the position of the image pickup section 2 at the first time is an origin O1 and the horizontal, vertical, and depth directions of the image pickup section 2 are X-axis, Y-axis, and Z-axis. Then, the three-dimensional position (X1$i$, Y1$i$, Z1$i$) of every pattern ai of the plate 1 is first obtained from the two-dimensional frame image $1A_1$. Then, a user designates a three-dimensional position (three-dimensional synthesis position) (X1A, Y1A, Z1A) on which the ball 5 is put and a three-dimensional position (three-dimensional synthesis position)(X1B, Y1B, Z1B) on which the ball 6 is put.

Then, a synthesis position (two-dimensional position) on the image $1A_1$ corresponding to a three-dimensional synthesis position is obtained. The two-dimensional position is obtained as a position obtained through perspective projection transform of the three-dimensional position. That is, when assuming the focal distance of the image pickup section 2 as f, the two-dimensional synthesis position of a projected image $5A_1$ on the image $1A_1$ at the first time corresponding to the three-dimensional synthesis position (X1A, Y1A, Z1A) is obtained as (X1A×F/Z1A, Y1A×f/Z1A). Similarly, the two-dimensional synthesis position of a projected image $6B_1$ on the image $1A_1$ at the first time corresponding to the three-dimensional synthesis position (X1B, Y1B, Z1B) is obtained as (X1B×f/Z1B, Y1B×f/Z1B).

Similarly, as shown in FIG. 7, the position of the image pickup section 2 at the second time is assumed as an origin O2 and the horizontal, vertical, and depth directions of the image pickup section 2 are assumed as X-axis, Y-axis, and Z-axis. Then, the three-dimensional position (X2$i$, Y2$i$, Z2$i$) of every pattern ai of the plate 1 is obtained from the two-dimensional image $1A_2$.

As described above, because the patterns ai on the plate 1 can be distinguished between them, it is possible to identify that the i-th pattern ai in the first three-dimensional coordinate system restored from the image $1A_1$ at the first time corresponds to which pattern ai in the second three-dimensional system restored from the image $1A_2$ at the second time. Therefore, it is possible to make the coordinates (X1$i$, Y1$i$, Z1$i$) of the pattern ai at the first time correspond to the coordinates (X2$i$, Y2$i$, Z2$i$) of the pattern ai at the second time. Because these two coordinate systems view the same pattern ai from different angles, the second three-dimensional coordinate system can be obtained by applying predetermined rotational transform (hereafter, the function of the transform is assumed as $R_1$) and predetermined rectilinear transform (hereafter, the function of the transform is assumed as $S_1$) to the first three-dimensional coordinate system (though the function of the rectilinear transform is normally shown by T, it is shown by S because T is used as a variable showing time in this specification). Therefore, the relation shown by the following Equation is, effected for each pattern ai.

$$(X2i, Y2i, Z2i) = (X1i, Y1i, Z1i) \cdot R_1 + S_1$$

(Though the function of the rectilinear transform is normally shown by T, it is shown by S because T is used as a variable showing time in this specification.)

Therefore, the coordinate transform functions $R_1$ and $S_1$ can be obtained by substituting (X1$i$, Y1$i$, Z1$i$) and (Z2$i$, Y2$i$, Z2$i$) of each pattern ai for the above Equation.

However, when restoring the position (three-dimensional coordinates) of the pattern ai in a three-dimensional space from image data (image data for the images $1A_1$ and $1A_2$) in a two-dimensional space picked up at a certain time, the restored position includes any error. Therefore, when using, for example, the first three-dimensional coordinate system as a criterion, the position of the i-th pattern ai is not exactly present at (X1$i$, Y1$i$, Z1$i$). Similarly, when using the second three-dimensional coordinate system A criterion, the position of the i-th pattern ai is not exactly present at (X2$i$, Y2$i$, Z2$i$).

Therefore, values obtained by squaring the magnitude of the three dimensional vector (x1, y1, z1) in the following Equation (1) on every pattern ai by the least-squares method are totalized to obtain the (most-probable) transform functions R1 and S1 for minimizing the total error.

$$(x1,y1,z1)=(X2i,Y2i,Z2i)-\{(X1i,Y1i,Z1i) \cdot R_1 + S_1\} \quad (1)$$

By using the transform functions $R_1$ and $S_1$ obtained as described above, the three-dimensional position (X2A, Y2A, Z2A) of the ball 5 at the second time corresponding to the three-dimensional position (X1A, Y1A, Z1A) of the ball 5 at the first time is obtained by the following Equation (2).

$$(X2A,Y2A,Z2A)=(X1A,Y1A,Z1A) \cdot R_1 + S_1 \quad (2)$$

Similarly, the position (X2B, Y2B, Z2B) of the ball 6 at the second time corresponding to the three-dimensional position (X1B, Y1B, Z1B) of the ball 6 at the first time is obtained by the following Equation (3).

$$(X2B,Y2B,Z2B)=(X1B,Y1B,Z1B) \cdot R_1 + S_1 \quad (3)$$

Then, by applying the relation of the perspective projection transform to the three-dimensional coordinates (X2A, Y2A, Z2A) and (X2B, Y2B, Z2B), the coordinates (X2A×f/Z2A, Y2A×f/Z2A) of the projected image $5A_2$ and the coordinates (X2B×f/Z2B, Y2B×f/Z2B) of the projected image $6B_2$ on the two-dimensional image $1A_2$ picked up by the image pickup section 2 at the second time are obtained. By synthesizing the projected images $5A_2$ and $6B_2$ with the coordinate positions, synthesized image must be seen so that the balls 5 and 6 are stationary for the plate 1 because the coordinate positions correspond to the coordinate positions of the projected images $5A_1$ and $6B_1$.

The position of the i-th pattern ai and the positions of the balls 5 and 6 at the first time are shown as (X1$i$, Y1$i$, Z1$i$), (X1A, Y1A, Z1A), and (X1B, Y1B, Z1B) in the first three-dimensional coordinate system. Moreover, the position of the i-th pattern ai and the positions of the balls 5 and 6 at the second time are shown as (X2$i$, Y2$i$, Z2$i$), (X2A, Y2A, Z2A), and (X2B, Y2B, Z2B) in the second three-dimensional coordinate system. In this case, the relation between the„positions of the i-th patterns ai and the positions of the balls 5 and 6 in these two coordinate systems can be shown by the following Equations (4), (5), and (6).

$$(X2i,Y2i,Z2i) \neq (X1i,Y1i,Z1i) \cdot R_1 + S_1 \quad (4)$$

$$(X2A,Y2A,Z2A)=(X1A,Y1A,Z1A) \cdot R_1 + S_1 \quad (5)$$

$$(X2B,Y2B,Z2B)=(X1B,Y1B,Z1B) \cdot R_1 + S_1 \quad (6)$$

That is, in the case of middle and bottom Equations among the above three Equations, because the left-side terms are obtained by operations of the right-side terms, the right and left terms are equal. However, as described above, the transform functions $R_1$ and $S_1$ are obtained by using the least-squares method and therefore, the functions include errors. As a result, as shown in the top Equation, the three-dimensional coordinates (obtained from a second image $1A_2$) of the pattern ai of the second image $1A_2$ do not accurately coincide with the coordinates obtained by applying the transform functions $R_1$ and $S_1$ to the three-dimensional coordinates (X1A, Y1A, Z1A) of a first image $1A_1$.

Therefore, the relation of projected images $5A_1$ and $6B_1$ to the pattern ai of the first image $1A_1$ at the first time is different from the relation of the projected images $5A_2$ and $6B_2$ to each pattern ai of the second image $1A_2$ at the second time. When reproducing this image string, there is a problem that the balls 5 and 6 seem to be unnatural because the balls 5 and 6 are lifted from the plate 1 on which the patterns ai are drawn.

DISCLOSURE OF THE INVENTION

The present invention is made to solve the above problems and its object is to provide an image synthesizing apparatus and method and a supply medium for making it possible that, when synthesizing the projected image of a predetermined object with a plurality of photographic images, a synthesized image seems to be natural by synthesizing the projected image of the predetermined object in accordance with a characteristic point nearby the synthesis position.

Moreover, it is another object of the present invention to provide position detecting apparatus and method and a supply medium capable of correctly calculating the positional relation of a third image to first and second images.

Furthermore, it is still another object of the present invention to provide image synthesizing apparatus and method and a supply medium capable of controlling the fluctuation of a synthesized image by correcting the position of the projected image of a predetermined object in accordance with a distortion value when synthesizing the projected image of the object with a plurality of photographic images.

The image synthesizing apparatus of claim 1 comprises first means for obtaining a first characteristic point nearby a synthesis position for synthesizing an object among the characteristic points projected onto a first image, second means for obtaining first coordinates of a first characteristic point on a three-dimensional coordinate system corresponding to the first image, third means for obtaining second coordinates of a second characteristic point corresponding to the first characteristic point on a three-dimensional coordinate system corresponding to a second image among the characteristic points projected onto the second image, fourth means for obtaining coordinate transform functions of the first and second coordinates, fifth means for obtaining third coordinates on a three-dimensional coordinate system corresponding to the first image at a synthesis position for synthesizing an object with the first image, sixth means for obtaining fourth coordinates on a three-dimensional coordinate system corresponding to the second image by applying the coordinate transform functions to the third coordinates, and seventh means for synthesizing the projected image of the object at a position corresponding to the fourth coordinates of the second image.

The image synthesizing method of comprises the first step of obtaining a first characteristic point nearby a synthesis position, for synthesizing an object among the characteristic points projected onto a first image, the second step of obtaining first coordinates on the three-dimensional coordinate system of a first characteristic point corresponding to the first image, the third step of obtaining second coordinates of a second characteristic point corresponding to the first characteristic point on a three-dimensional coordinate system corresponding to a second image among the characteristic points projected onto the second image, the fourth step of obtaining coordinate transform functions of the first coordinates and the second coordinates, the fifth step of obtaining third coordinates on a three-dimensional coordinate system corresponding to the first image at a synthesis position for synthesizing an object with the first image, the sixth step of obtaining fourth coordinates on a three-dimensional coordinate system corresponding to the second image by applying the coordinate transform functions to the third coordinates, and the seventh step of synthesizing the projected image of an object at a position corresponding to the fourth coordinates of the second image.

The supply medium of provides a computer program used for an image synthesizing apparatus for synthesizing the projected image, of an object with at least first and second images and comprising the first step of obtaining a first characteristic point nearby a synthesis position for synthesizing an object among the characteristic points projected onto the first image, the second step of obtaining first coordinates of a first characteristic point on a three-dimensional coordinate system corresponding to the first image, the third step of obtaining second coordinates of a second characteristic point corresponding to the first characteristic point on a three-dimensional coordinate system corresponding to the second image among the characteristic points projected onto the second image, the fourth step of obtaining coordinate transform functions of the first and second coordinates, the fifth step of obtaining third coordinates on a three-dimensional coordinate system corresponding to the first image at a synthesis position for synthesizing an object with the first image, the sixth step of obtaining fourth coordinates on a three-dimensional coordinate system corresponding to the second image by applying the coordinate transform functions to the third coordinates, and the seventh step of synthesizing the projected image of an object at a position corresponding to the fourth coordinates of the second image.

The position detecting apparatus comprises first means for obtaining a first characteristic point nearby an object among the characteristic points projected onto a first image, second means for obtaining first coordinates of the first characteristic point on a three-dimensional coordinate system corresponding to the first image, third means for obtaining second coordinates of a second characteristic point corresponding to the first characteristic point on a three-dimensional coordinate system corresponding to the second image among the characteristic points projected onto the second image, fourth means for obtaining third coordinates of the object on a three-dimensional coordinate system corresponding to the first image, fifth means for obtaining fourth coordinates of the object on a three-dimensional coordinate system corresponding to the second image, sixth means for obtaining coordinate transform functions of the first and second coordinates, seventh means for obtaining fifth coordinates on a three-dimensional coordinate system corresponding to the second image by applying the coordinate transform functions to the third coordinates, and eighth means for detecting the difference between the fourth coordinates and the fifth coordinates.

The position detecting method comprises the first step of obtaining a first characteristic point nearby an object among the characteristic points projected onto a first image, the second step of obtaining first coordinates of the first characteristic point on a three-dimensional coordinate system corresponding to the first image, the third step of obtaining second coordinates of a second characteristic point corresponding to the first characteristic point on a three-dimensional coordinate system corresponding to the second image among the characteristic points projected onto the second image, the fourth step of obtaining third coordinates of the object on a three-dimensional coordinate system corresponding to the first image, the fifth step of obtaining fourth coordinates of the object on a three-dimensional coordinate system corresponding to the second image, the sixth step of obtaining coordinate transform functions of the first and second coordinates, the seventh step of obtaining fifth coordinates on a three-dimensional coordinate system corresponding to the second image by applying the coordinate transform functions to the third coordinates, and the eighth step of detecting the difference between the fourth and fifth coordinates.

The supply medium provides a computer program used for a position detecting apparatus for detecting the positional relation of an object projected onto first and second images and comprising the first step of obtaining a first characteristic point nearby the object among the characteristic points projected onto the first image, the second step of obtaining first coordinates of the first characteristic point on a three-dimensional coordinate system corresponding to the first image, the third step of obtaining second coordinates of a second characteristic point corresponding to the first characteristic point on a three-dimensional coordinate system corresponding to the second image among the characteristic points projected onto the second image, the fourth step of obtaining third coordinates of the object on a three-dimensional coordinate system corresponding to the first image, the fifth step of obtaining fourth coordinates of the object on a three-dimensional coordinate system corresponding to the second image, the sixth step of obtaining coordinate transform functions of the first and second coordinates, the seventh step of obtaining fifth coordinates on a three-dimensional coordinate system corresponding to the second image by applying the coordinate transform functions to the third coordinates, and the eighth step of detecting the difference between the fourth and fifth coordinates.

The image synthesizing apparatus of claim 1 comprises image-pickup-device-position computing means for computing the most-probable position of an image pickup device when photographing each of a plurality of photographic images, characteristic point position computing means for computing the most-probable position of the characteristic point of a first object, virtual projected position computing means for computing a virtual projected position to which the most-probable position of a characteristic point is projected when performing photography by using an image pickup device present at the most-probable position, distortion value computing means for computing a distortion value in accordance with the difference between a virtual projected position and the position of a projected image of a characteristic point actually photographed on each of a plurality of photographic images, correcting means for correcting a position to which the projected image of a second object is set in accordance with the distortion value computed by the distortion value computing means, projected image computing means for computing the projected image of the second object when photographing the second object from an image pickup device at the most-probable position by assuming that the second object is located at the corrected position by the correcting means, and synthesizing means for synthesizing the projected image of the second object computed by the projected image computing means with each photographic image.

The image synthesizing method of claim 3 comprises the image-pickup-device-position computing step of computing the most-probable position of an image pickup device when photographing each of a plurality of photographic images, the characteristic point position computing step of computing the most-probable position of the characteristic point of a first object, the virtual projected position computing step of computing a virtual projected position to which the most-probable position of a characteristic point is projected when performing photography by using an image pickup device present at the most-probable position, distortion value computing step of computing a distortion value in accordance with the difference between a virtual projected position and the position of the projected image of a characteristic point actually photographed on each of a plurality of photographic images, the correcting step of correcting a position to which the projected image of a second object is set in accordance with the distortion value computed in the distortion value computing step, the projected image computing step of computing the projected image of the second object when photographing the second object from an image pickup device at the most-probable position by assuming that the second object is located at the position corrected in the correcting step, and the synthesizing step of synthesizing the projected image of the second object computed in the projected image computing step with each photographic image.

The supply medium of claim 5 provides a computer program used for an image synthesizing apparatus for synthesizing the projected image of a second object with each of a plurality of photographic images on which a first object photographed by an image pickup device is photographed by assuming that the second object is located at a predetermined position and comprising the image-pickup-device-position computing step of computing the most-probable position of the image pickup device when photographing each of a plurality of photographic images, the characteristic point position computing step of computing the most-probable position of the characteristic point of the first object, virtual projected position computing step of computing a virtual projected position to which the most-probable position of a characteristic point is projected when performing photography by using an image pickup device present at the most-probable position, the distortion value computing step of computing a distortion value in accordance with the difference between a virtual projected position and the position of the projected image of the characteristic point actually photographed on each of a plurality of photographic images, the correcting step of correcting a position to which the projected image of a second object is set in accordance with the distortion value computed in the distortion value computing step, projected image computing step of computing the projected image of the second object when photographing the second object from an image pickup device at the most-probable position by assuming that the second object is located at the position corrected in the correcting step, and the synthesizing step of synthesizing the projected image of the second object computed in the projected image computing step with each photographic image.

In the case of the image synthesizing apparatus, first means obtains a first characteristic point nearby a synthesis position for synthesizing the image of an object among the characteristic points projected onto a first image, second means obtains first coordinates of a first characteristic point on a three-dimensional coordinate system corresponding to the first image, third means obtains second coordinates of a second characteristic point corresponding to the first characteristic point on a three-dimensional coordinate system corresponding to a second image among the characteristic points projected onto the second image, fourth means obtains coordinate transform functions of the first and second coordinates, fifth means obtains third coordinates on a three-dimensional coordinate system corresponding to the first image at a synthesis position for synthesizing the object with the first image, sixth means obtains fourth coordinates on a three-dimensional coordinate system corresponding to the second image by applying the coordinate transform functions to the third coordinates, and seventh means synthesizes the projected image of the object at a position corresponding to the fourth coordinates of the second image.

In the case of the image synthesizing method and the supply medium, a first characteristic point nearby a synthesis position for synthesizing an object is obtained among the characteristic points projected onto a first image, first coordinates of the first characteristic point on a three-dimensional coordinate system corresponding to the first image are obtained, second coordinates of a second characteristic point corresponding to the first characteristic point on a three-dimensional coordinate system corresponding to the second image among the characteristic points projected onto the second image are obtained, coordinate transform functions of the first and second coordinates are obtained, third coordinates on a three-dimensional coordinate system corresponding to the first image at a synthesis position for synthesizing the object with the first image are obtained, and fourth coordinates on a three-dimensional coordinate system corresponding to the second image are obtained by applying the coordinate transform functions to the third coordinates to synthesize the projected image of the object at a position corresponding to the fourth coordinates of the second image.

In the case of the position detecting apparatus, first means obtains a first characteristic point nearby an object among the characteristic points projected onto a first image, second means obtains first coordinates of the first characteristic point on a three-dimensional coordinate system corresponding to the first image, third means obtains second coordinates of a second characteristic point corresponding to the first characteristic point on a three-dimensional coordinate system corresponding to the second image among the characteristic points projected onto the second image, fourth means obtains third coordinates of the object on a three-dimensional coordinate system corresponding to the first image, fifth means obtains fourth coordinates of the object on a three-dimensional coordinate system corresponding to the second image, sixth means obtains coordinate transform functions of the first and second coordinates, seventh means obtains fifth coordinates on a three-dimensional coordinate system corresponding to the second image by applying the coordinate transform functions to the third coordinates, and eighth means detects the difference between the fourth and fifth coordinates.

In the case of the position detecting method and the supply medium, a first characteristic point nearby an object is obtained among the characteristic points projected onto a first image, first coordinates of the first characteristic point on a three-dimensional coordinate system corresponding to the first image are obtained, second coordinates of a second characteristic point corresponding to the first characteristic point on a three-dimensional coordinate system corresponding to the second image are obtained among the characteristic points projected onto the second image, third coordinates of the object on a three-dimensional coordinate system corresponding to the first image are obtained, fourth coordinates of the object on a three-dimensional coordinate, system corresponding to the second image are obtained, coordinate transform functions of the first and second coordinates are obtained, and fifth coordinates on a three-dimensional coordinate system corresponding to the second image are obtained by applying the coordinate transform functions to the third coordinates to detect the difference between the fourth and fifth coordinates.

In the case of the image synthesizing apparatus of claim 1, image-pickup-device-position computing means computes the most-probable position of an image pickup device when photographing each of a plurality of photographic images, characteristic point position computing means computes the most-probable position of the characteristic point of a first object, virtual projected position computing means computes a virtual projected position to which the most-probable position of a characteristic point is projected when performing photography by using an image pickup device present at the most-probable position, distortion value computing means computes a distortion value in accordance with the difference between a virtual projected position and the position of the projected image of the characteristic point actually photographed on each of a plurality of photographic images, correcting means corrects a position to which the projected image of a second object is set in accordance with the distortion value computed by the distortion value computing means, projected image computing means computes the projected image of the second object when photographing the second object from an image pickup device present at the most-probable position by assuming that a second object is located at the position corrected by the correcting means, and synthesizing means synthesizes the projected image of the second object computed by the projected image computing means with each photographic image.

In the case of the image synthesizing method of claim 3 and the supply medium of claim 5, the most-probable position of an image pickup device when photographing each of a plurality of photographic images is computed, the most-probable position of a characteristic point of a first object is computed, a virtual projected position to which the most-probable position of a characteristic point is projected when performing photography by using an image pickup device set to the most-probable position is computed, a distortion value is computed in accordance with the difference between a virtual projected position and the position of the projected image of the characteristic point actually photographed on each of a plurality of photographic images, a position to which the projected image of a second object is set in accordance with the computed distortion value is corrected, and the projected image of the second object when photographing the second object from an image pickup device present at the most-probable position is computed by assuming that the second object is located at a corrected position to synthesize the projected image of the computed second object with each photographic image.

BEST MODE FOR CARRYING OUT THE INVENTION

Figure 1:
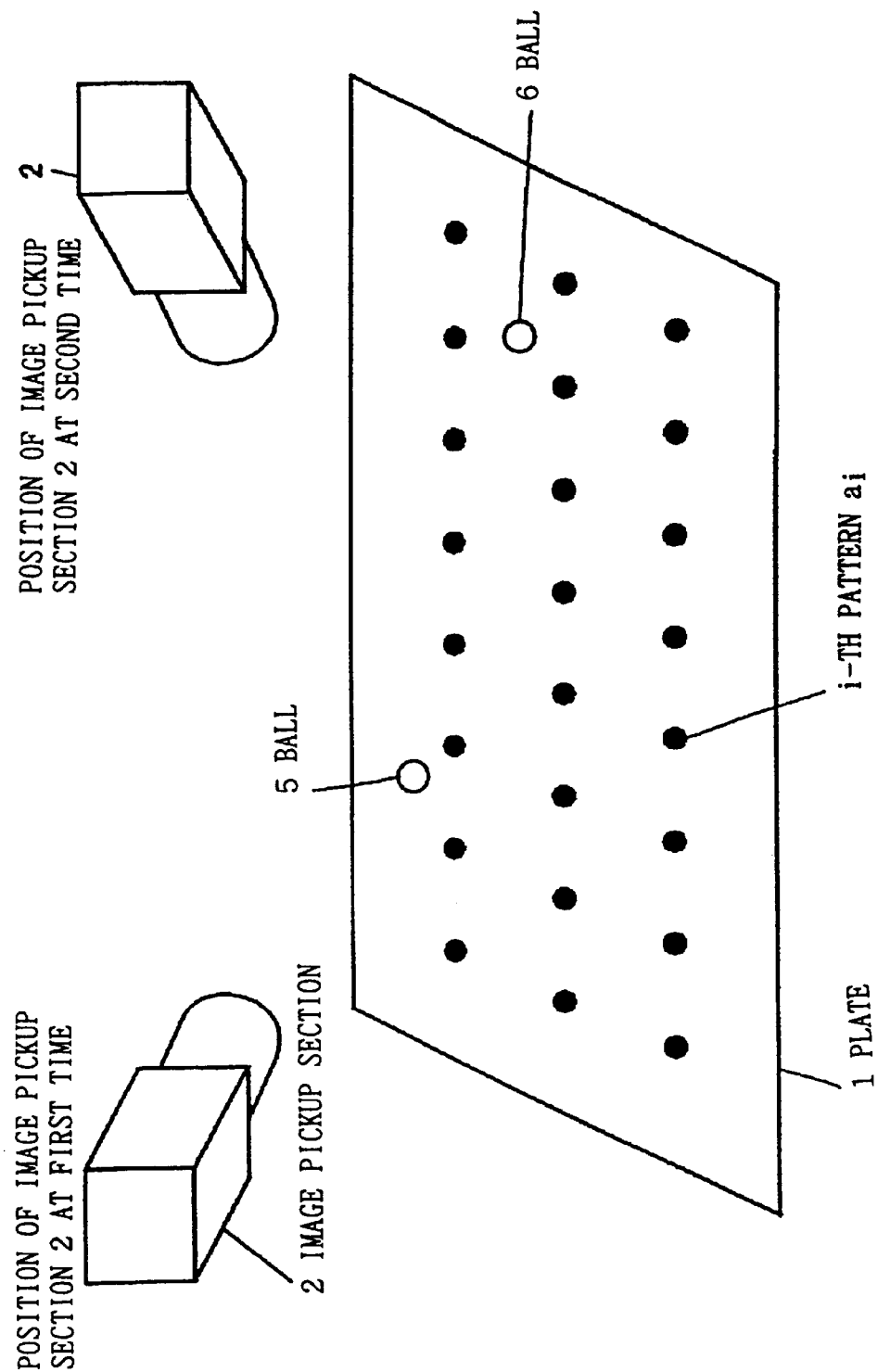
FIG. 1 is an illustration showing a positional relation between the image pickup section 2 and the plate 1 of a conventional image synthesizing method.
Figure 2:
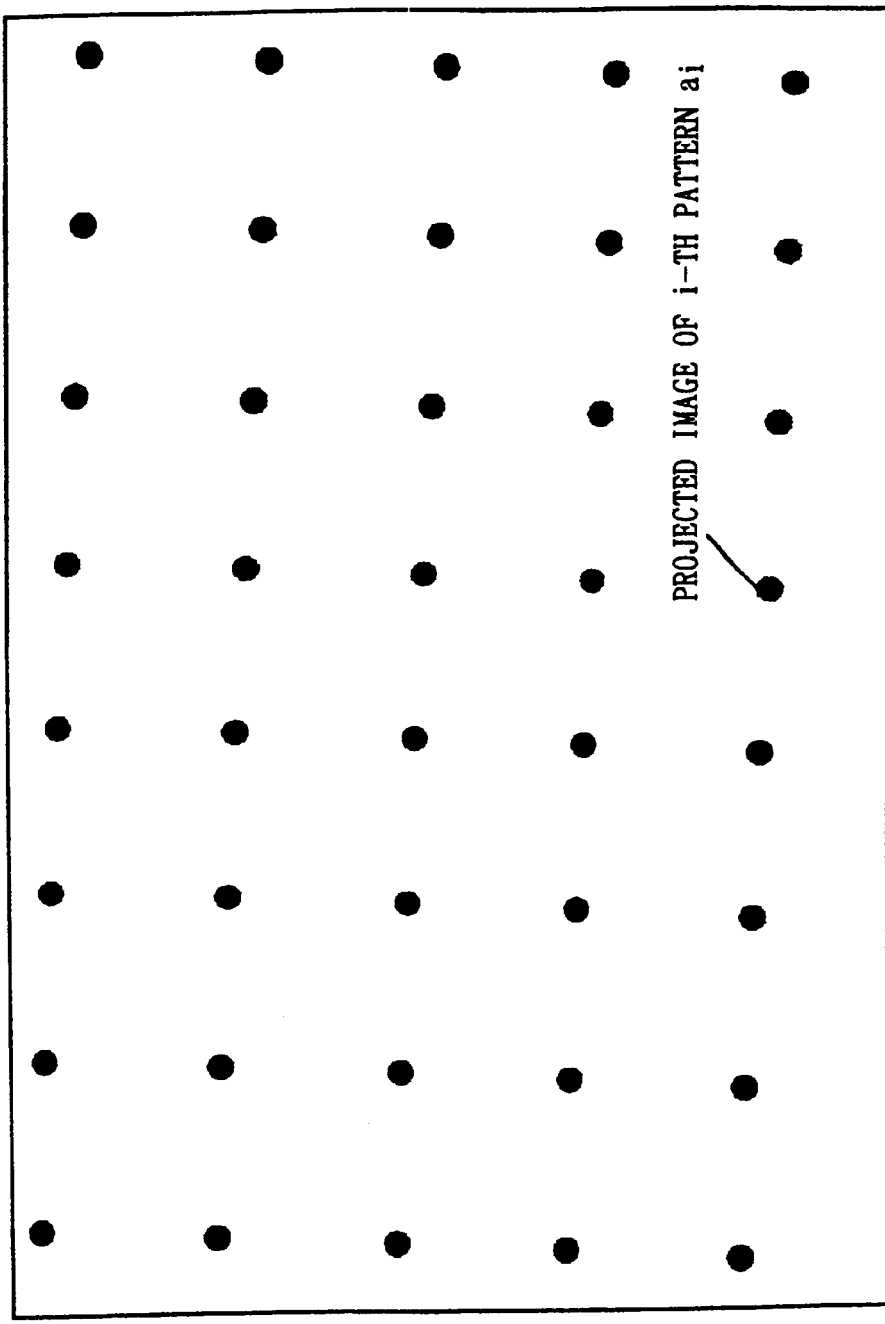
FIG. 2 is an illustration showing an image pickup example of the plate 1 of the image pickup section 2 in FIG. 1.
Figure 3:
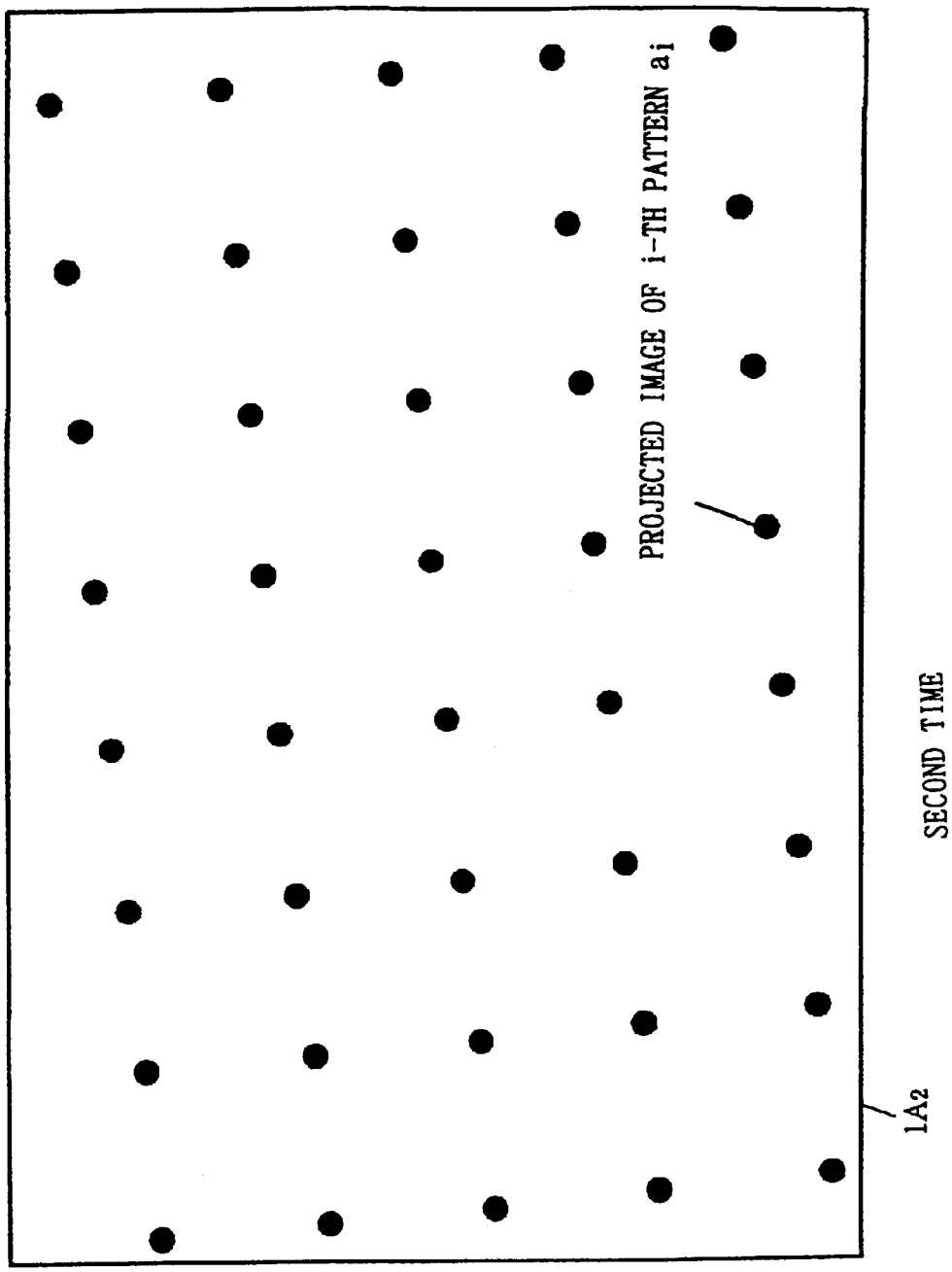
FIG. 3 is an illustration of another image pickup example of the plate 1 of the image pickup section 2 in FIG. 1.
Figure 4:
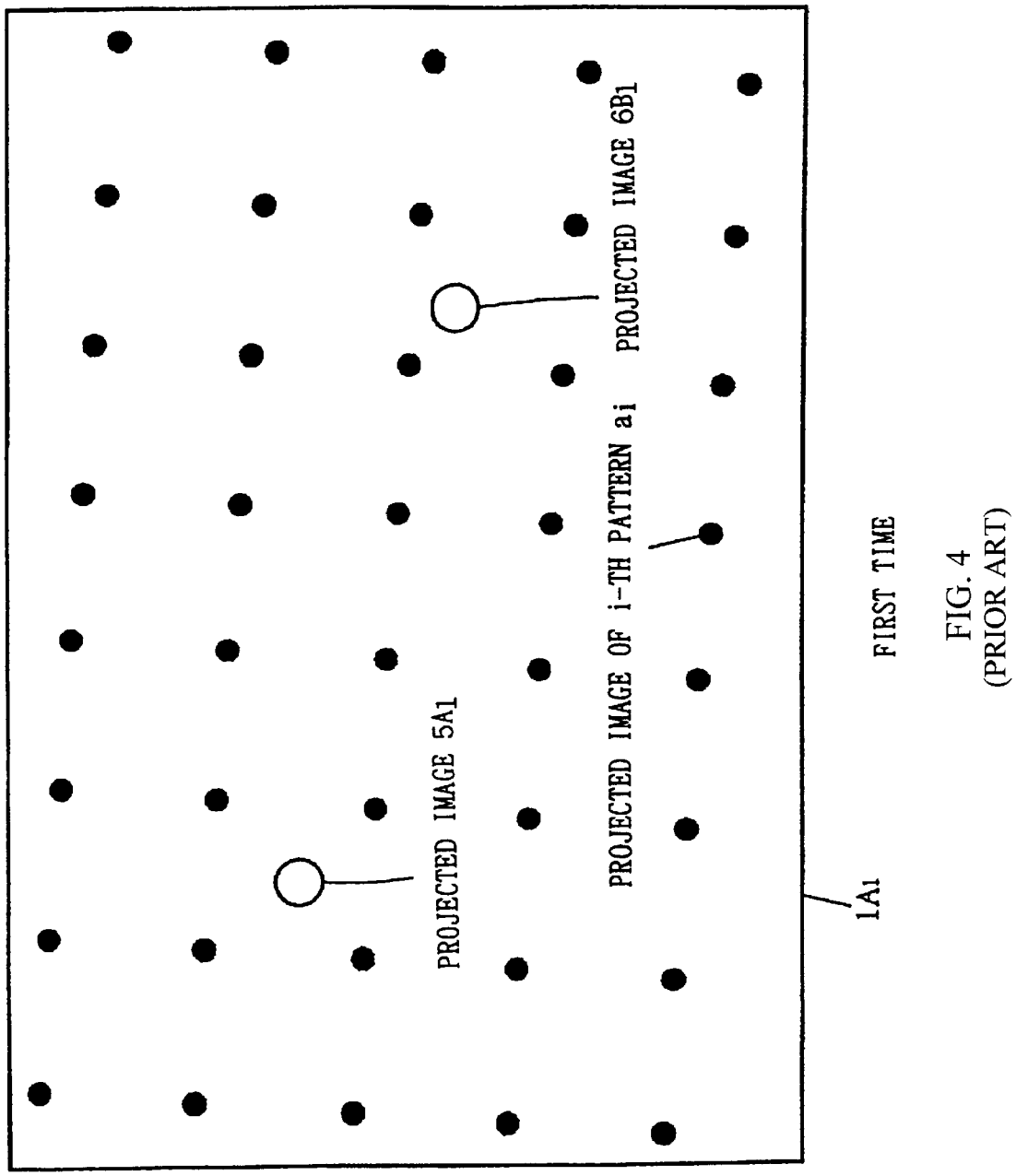
FIG. 4 is an illustration showing a synthesizing example of the balls 5 and 6 in FIG. 1.
Figure 5:
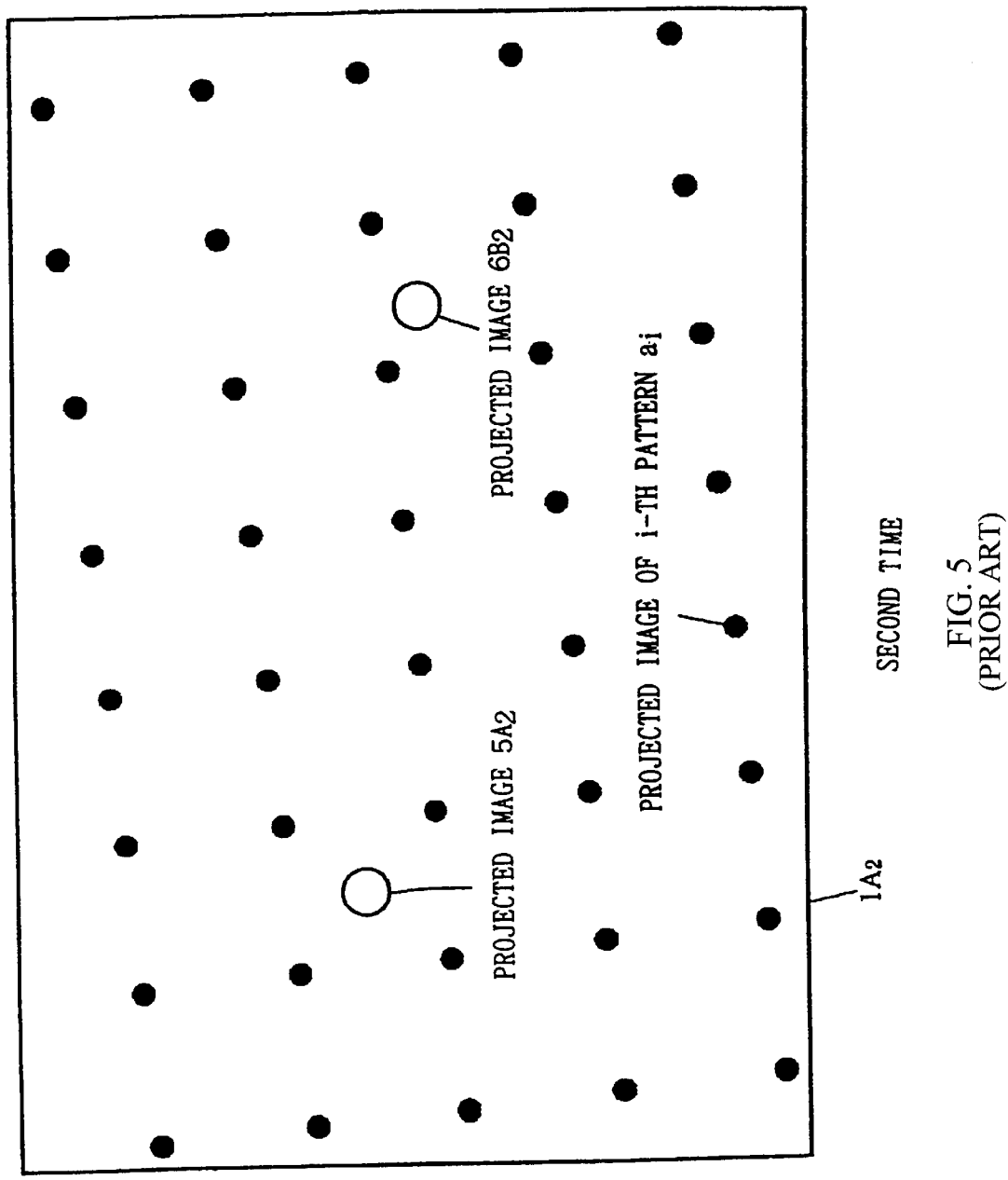
FIG. 5 is an illustration showing another synthesizing example of the balls 5 and 6 in FIG. 1.
Figure 6:
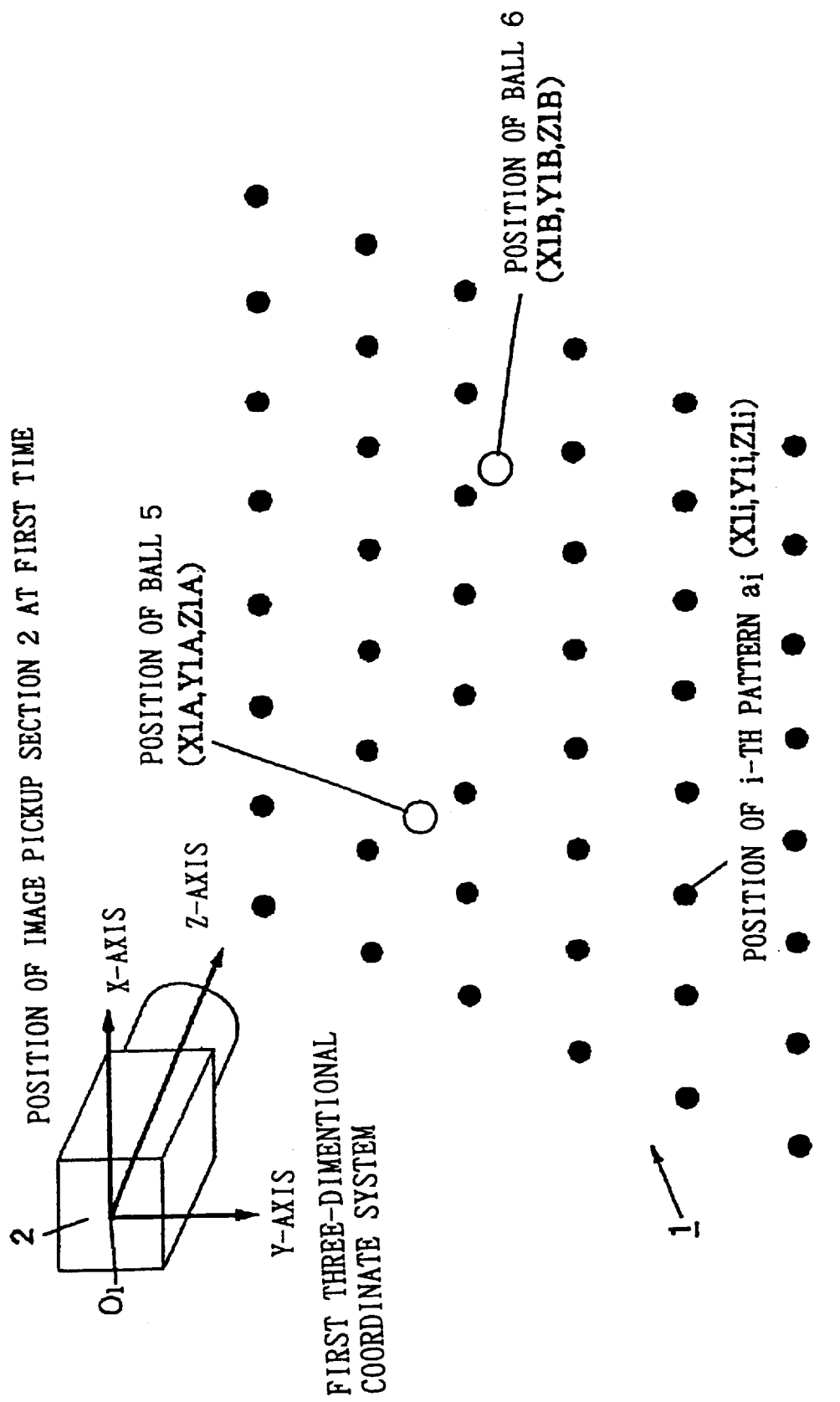
FIG. 6 is an illustration showing a positional relation between the image pickup section 2 and the plate 1 in FIG. 1.
Figure 7:
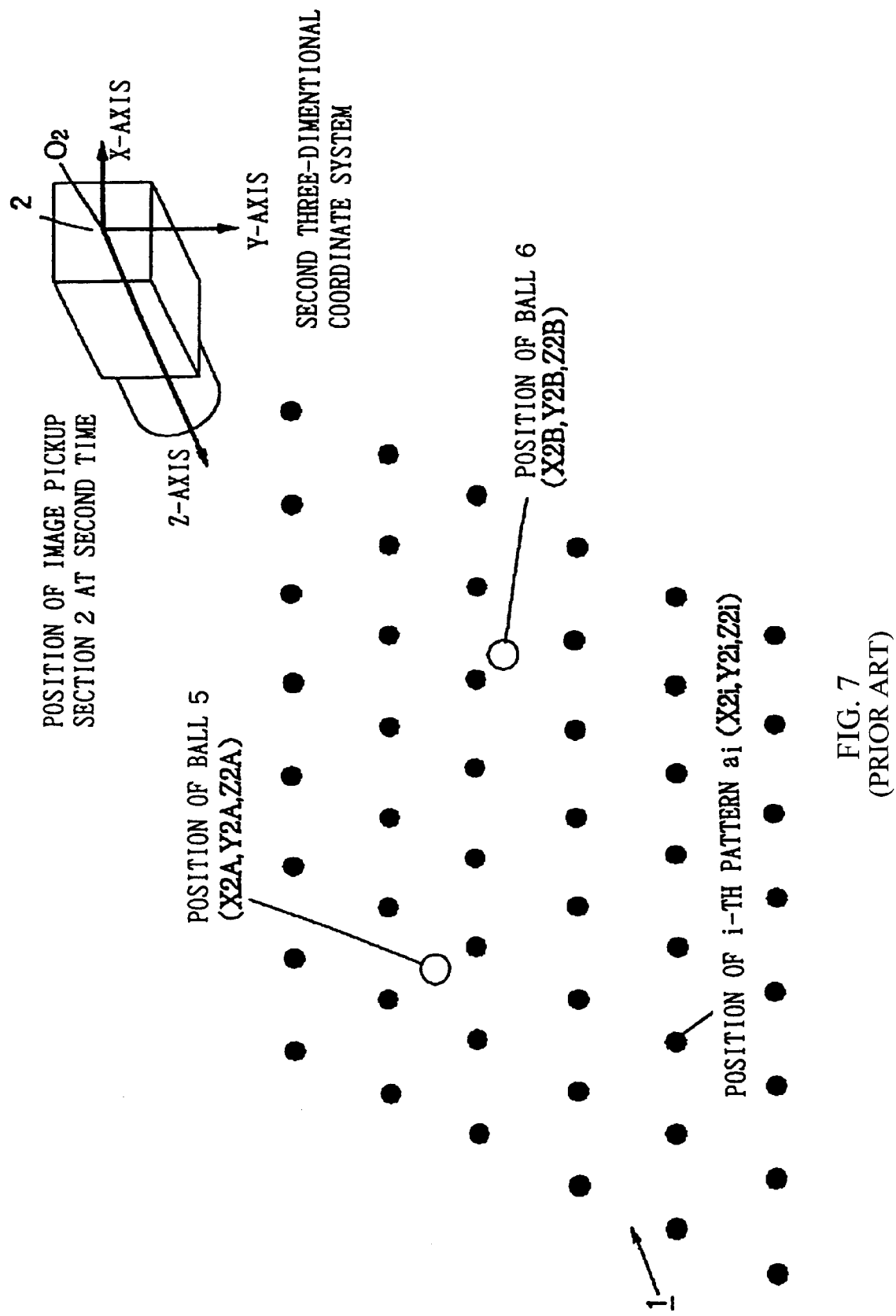
FIG. 7 is an illustration showing another positional relation between the image pickup section 2 and the plate 1 in FIG. 1.

An embodiment of the present invention is described below by referring to the accompanying drawings.

To clarify the corresponding relation between each means of the inventions of claims and the following embodiment, features of the present invention are described below by adding a corresponding embodiment (one example) into the parentheses after each means.

That is, the image synthesizing apparatus of claim 1 comprises first means (e.g. step S3 in FIG. 9) for obtaining a first characteristic point nearby a synthesis position for synthesizing an object among the characteristic points projected onto a first image, second means (e.g. step S2 in FIG. 9) for obtaining first coordinates of the first characteristic point on a three-dimensional coordinate system corresponding to the first image, third means (e.g. step S6 in FIG. 9) for obtaining second coordinates of a second characteristic point corresponding to the first characteristic point on a three-dimensional coordinate system corresponding to the second image among the characteristic points projected onto the second image, fourth means (e.g. step S7 in FIG. 9) for obtaining coordinate transform functions of the first and second coordinates, fifth means (e.g. step S3 in FIG. 9) for obtaining third coordinates on a three-dimensional coordinate system corresponding to the first image at a synthesis position for synthesizing the object with the first image, sixth means (e.g. step S8 in FIG. 9) for obtaining fourth coordinates on a three-dimensional coordinate system corresponding to the second image by applying a coordinate transform function to the third coordinates, and seventh means (e.g. step S10 in FIG. 9) for synthesizing the projected image of the object at a position corresponding to the fourth coordinates of the second image.

The position detecting apparatus comprises first means (e.g. Step S34 in FIG. 12) for obtaining a first characteristic point nearby an object among the characteristic points projected onto a first image, second means (e.g. step S32 in FIG. 12) for obtaining first coordinates of a first characteristic point on a three-dimensional coordinate system corresponding to the first image, third means (e.g. step S36 in FIG. 12) for obtaining second coordinates of a second characteristic point corresponding to the first characteristic point on a three-dimensional coordinate system corresponding to the second image among the characteristic points projected onto the second image, fourth means (e.g. step S33 in FIG. 12) for obtaining third coordinates of the object on a three-dimensional coordinate system corresponding to the first image, fifth means (e.g. step S37 in FIG. 12) for obtaining fourth coordinates of the object on a three-dimensional coordinate system corresponding to the second image, sixth means (e.,g. step S38 in FIG. 12) for obtaining coordinate transform functions of the first and second coordinates, seventh means (e.g. step S39 in FIG. 12) for obtaining fifth coordinates on a three-dimensional coordinate system corresponding to the second image by applying the coordinate transform functions to the third coordinates, and eighth means (e.g. step S40 in FIG. 12) for detecting the difference between the fourth and fifth coordinates.

The image synthesizing apparatus of claim 1 comprises image-pickup-device-position computing means (e.g. step S61 in FIG. 18) for computing the most-probable position of an image pickup device when photographing each of a plurality of photographic images, characteristic point position computing means (e.g. step S61 in FIG. 18) for computing the most-probable position of the characteristic point of a first object, virtual projected position computing means (e.g. step S61 in FIG. 18) for computing a virtual projected position on which the most-probable position of a characteristic point is projected when performing photography by using an image pickup device set at the most-probable position, distortion value computing means (e.g. step S63 in FIG. 18) for computing a distortion value in accordance with the difference between a virtual projected position and the position of the projected image of a characteristic point actually photographed on each of a plurality of photographic images, correcting means (e.g. step S66 in FIG. 18) for correcting a position to which the projected image of a second object is set in accordance with the distortion value computed by the distortion value computing means, projected image computing means (e.g. step S67 in FIG. 18) for computing the projected image of the second object when photographing the second object from an image pickup device present at the most-probable position by assuming that the second object is located at the position corrected by the correcting means, and synthesizing means (e.g. step S67 in FIG. 18) for synthesizing the projected image of the second object computed by the projected image computing means with each photographic image.

Of course, the above description does not mean that it is restricted to the description of each means.

An embodiment of an image synthesizing apparatus of the present invention is described below by referring to FIG. 8.

Figure 8:
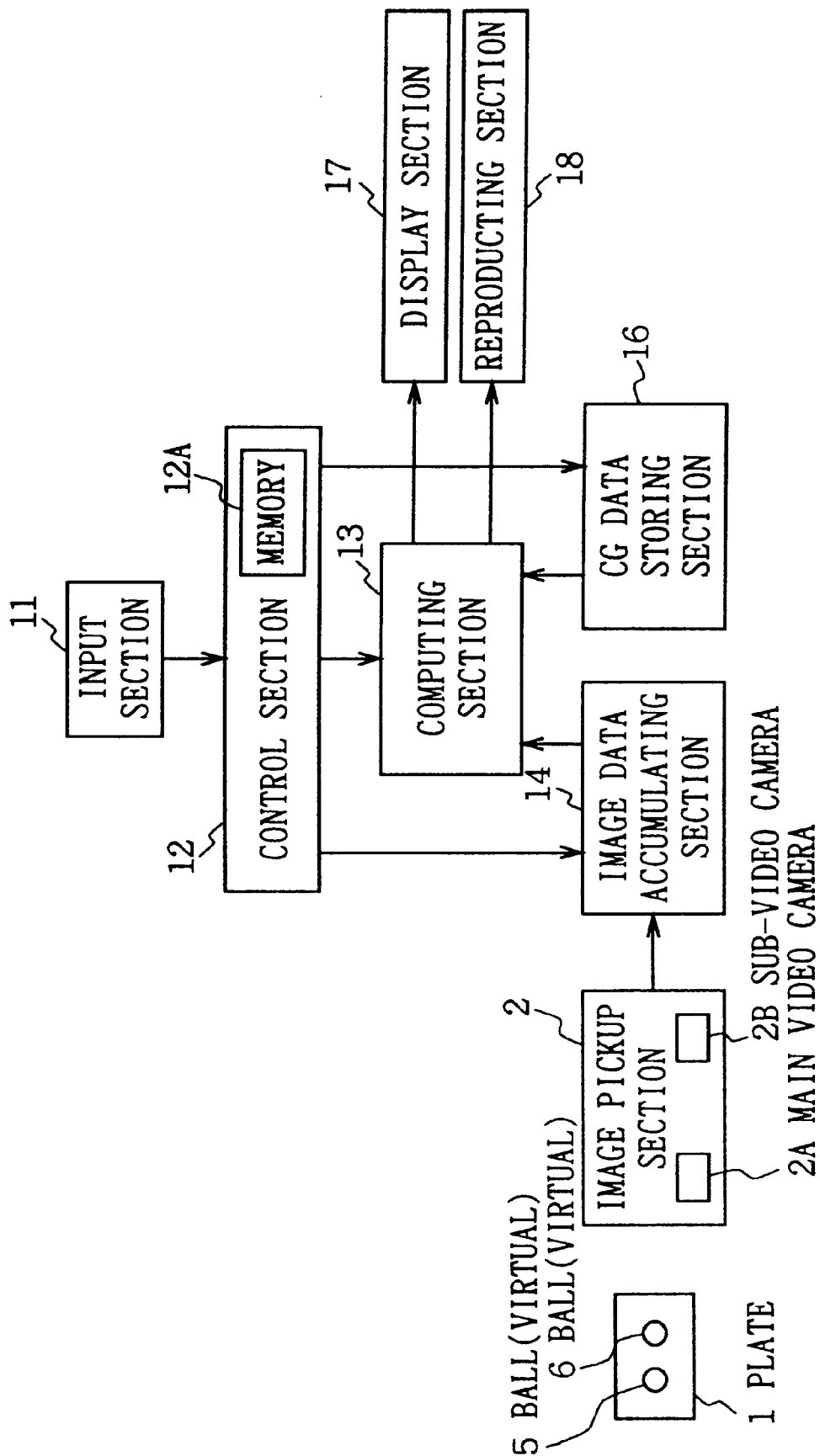
FIG. 8 is a block diagram showing the structure of the first embodiment of an image synthesizing apparatus of the present invention.

As shown in FIG. 8, the image synthesizing apparatus of the present invention has an input section 11 to be operated by a user when the user inputs the synthesis position of a CG image (image of the ball 5 or 6). The input section 11 is constituted with, for example, a keyboard, a touch panel, a mouse, and a remote controller.

A control section 12 controls each section in order to synthesize CG data. Moreover, the control section 12 has a memory 12A in which a program for synthesizing the CG data is stored. A computing section 13 performs various operations for synthesizing the CG data input from a CG data storing section 16 with the image data input from an image data accumulating section 14. Moreover, the computing section 13 is constituted so as to output an image synthesized with the CG data to a reproducing section 18. The control section 12 and the computing section 13 are realized by, for example, a microcomputer.

An image pickup section 2 uses, for example, a stereophonic video camera constituted with a main video camera 2A and a sub-video camera 2B and is constituted so as to pickup a plate 1 with the main video camera 2A and sub-video camera 2B and output the picked-up image data to the image data accumulating section 14. The image data accumulating section 14 is controlled by the control section 12, which accumulates the image data input from the image pickup section 2 and outputs the data to the computing section 13.

The CG data storing section 16 is controlled by the control section 12, which stores CG data (image data of the balls 5 and 6) to be synthesized with the image data picked up by the image pickup section 2 and outputs the CG data to the computing section 13. A display section 17 displays the image data picked up by the image pickup section 2 or the positional information of the plate 1 output from the computing section 13. A reproducing section 18 reproduces image data with which the CG data input from the computing section 13 is synthesized.

Figure 9:
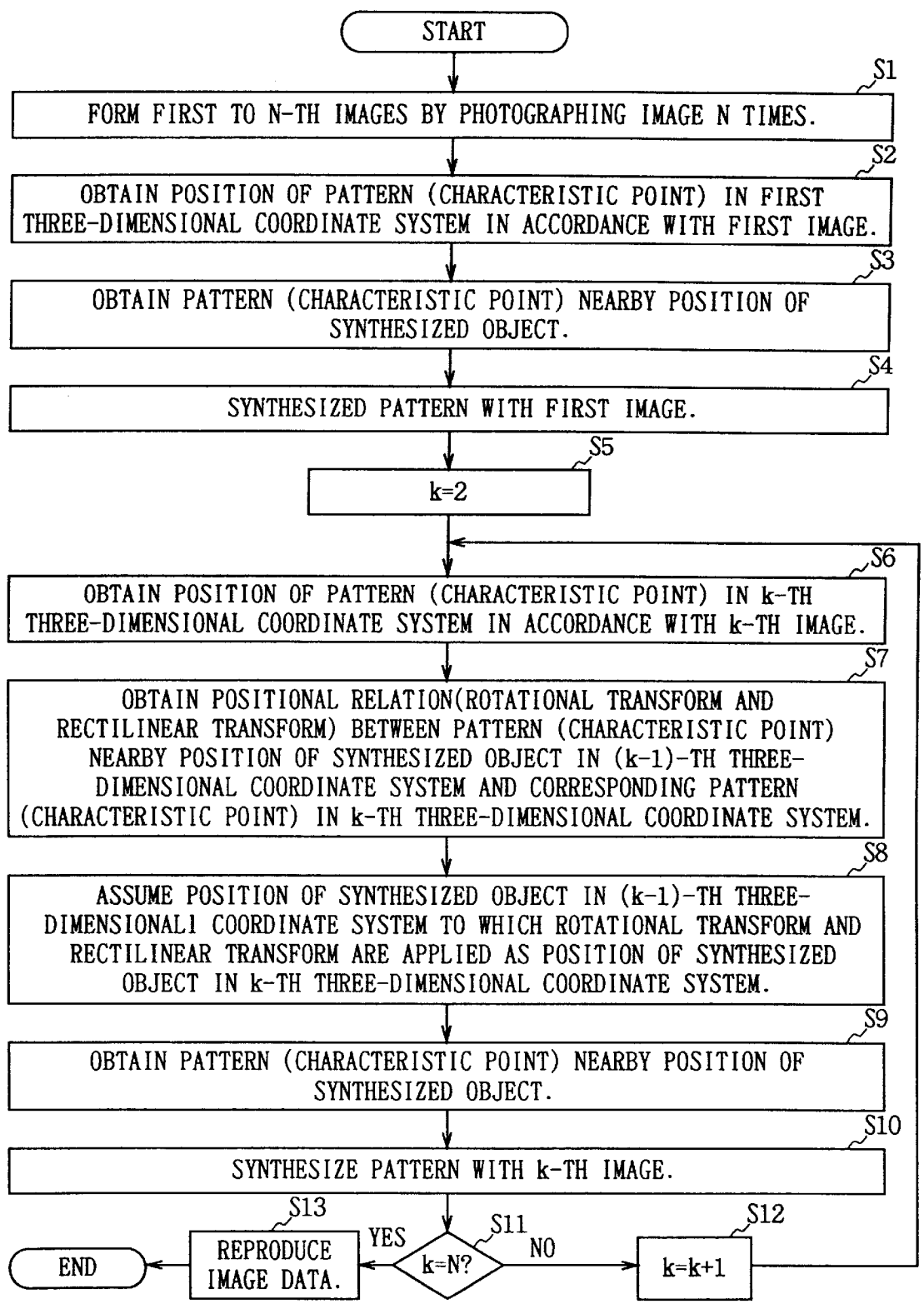
FIG. 9 is a flowchart for explaining an operation of the embodiment in FIG. 8.

Then, operations, of the embodiment thus constituted are described below by referring to the flowchart in FIG. 9.

In step S1, a user operates the input section 11 to command it to start pickup of the plate 1. The input section 11 outputs a signal corresponding to the command to the control section 12. The control section 12 makes the image data accumulating section 14 accumulate the image data sent from the image pickup section 2 in accordance with the signal.

The image pickup :section 2 (the main video camera 2A and sub-video camera 2B) picks up the plate 1 while being moved by the user and outputs the picked-up image data to the image data accumulating section 14, and the image data is stored in the image data accumulating section 14. In this case, it is assumed that the number of images picked up by the image pickup section 2 is N. Moreover, it is assumed that the identification numbers k from 1 to N are provided for these images in time series and the time when the k-th (k=1, . . . , N) image $1A_k$ is formed is the k-th time. Furthermore, the control section 12 makes the memory 12A store the identification numbers k to use the memory 12A as counter for synthesis processing.

When pickup is completed, the control section 12 controls the image data accumulating section 14 in step S2 to make the section 14 output the image data accumulated in the section 14 to the computing section 13. The computing section 13 obtains a characteristic point (e.g. pattern on the plate 1, defect on the plate 1, or other pattern) which extremely changes compared to a point to which a brightness signal or color-difference signal of the image data input from the image data accumulating section 14 is adjacent and therefore, the characteristic point can be separated from other part of the image data. In this case, the i-th characteristic point (pattern) is assumed as ai. In this case, symbol i denotes an integer which is an identification number provided for each pattern ai. Moreover, the computing section 13 compares the same patterns ai out of the image data input from the main video camera 2A and the sub-video camera 2B at the same time, calculates the parallax between the patterns, and obtains the three-dimensional position (coordinates) of every pattern (characteristic point) ai. Because the three-dimensional position is obtained by using the parallax between the cameras, this position is a position on three-dimensional coordinates using the camera (image pickup section 2) as an origin. That is, for example, the position in the three-dimensional coordinates shown in FIG. 10 to be described later is obtained.

Figure 10:
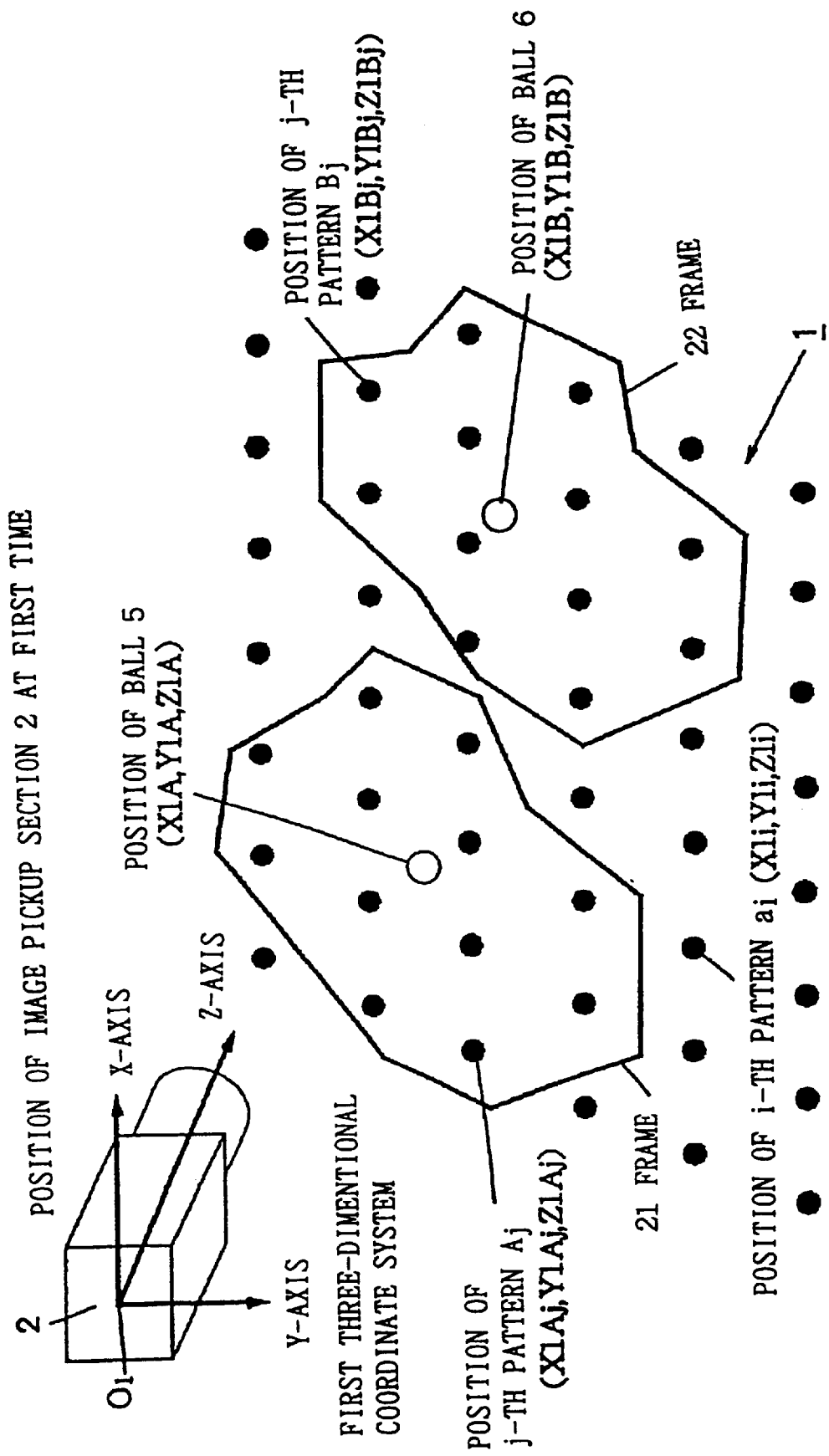
FIG. 10 is an illustration showing a positional relation between the image pickup section 2 and the plate 1 of the embodiment in FIG. 8.

For example, as shown in FIG. 10, it is assumed that the position of the image pickup section 2 at the first time is an origin O1 and the horizontal direction, vertical direction, and depth direction of the image pickup section 2 are X-axis, Y-axis, And Z-axis. The computing section 13 obtains the three-dimensional position (X1$i$, Y1$i$, Z1$i$) of the every pattern ai on the image $1A_1$ of the plate 1 at the first time.

Then, in step S3, the computing section 13 outputs the position of every pattern ai and the first image $1A_1$ to the display section 17 to make the section 17 display the position of every pattern ai and the position of the first image $1A_1$. The user operates the input section 11, and designates and inputs the three-dimensional position (X1A, Y1A, Z1A) of the ball 5 for synthesizing the projected image $5A_1$ of the ball 5 with the first image $1A_1$ and the three-dimensional position (X1B, Y1B, Z1B) of the ball 6 for synthesizing the projected image 6B1 of the ball 6 with the first image $1A_1$ based on the position information at the first time displayed in the display section 17.

Then, the computing section 13 obtains the three-dimensional vector (x2, y2, z2) between the ball 5 and the pattern ai on every pattern ai in accordance with the following Equation (7) and selects a predetermined number of patterns (e.g. 12 patterns) (in the portion enclosed by the frame 21 in FIG. 10) Aj (j=1, . . . , 12) in order of magnitudes of the vectors starting with a vector having the smallest magnitude (starting with a vector closest to the ball 5).

$$(x2,y2,z2)=(X1i,Y1i,Z1i)-(X1A,Y1A,Z1A) \quad (7)$$

Then, the positions of the 12 selected patterns Aj (j=1, . . . , 12) are assumed as (X1Aj, Y1Aj, Z1Aj) (j=1, . . . , 12).

Similarly, the computing section 13 obtains three-dimensional vectors (x3, y3, z3) between the ball 6 and the pattern ai on all patterns ai in accordance with the following Equation (8) and selects 12 patterns (in the portion enclosed by the frame 22 in FIG. 10) Bj (j=1, . . . , 12) in order of magnitudes of the vectors starting with a vector having the smallest magnitude (starting with a vector closest to the ball 6).

$$(x3,y3,z3)=(X1i,Y1i,Z1i)-(X1B,Y1B,Z1B) \quad (8)$$

Then, the positions of the 12 selected patterns Bj (j=1, . . . , 12) are assumed as (X1Bj, Y1Bj, Z1Bj) (j=1, . . . , 12).

Thus, a characteristic point nearby a synthesis position is obtained and then, step S4 is started to perform image synthesis processing. That is, the computing section 13 obtains a two-dimensional synthesis position on the first image $1A_1$ corresponding to a three-dimensional synthesis position. The two-dimensional synthesis position is obtained by perspective-projection-transforming the three-dimensional synthesis position. That is, when assuming the focal distance of the image pickup section 2 as f, the two-dimensional position of the projected image $5A_1$ of the ball 5 on the image $1A_1$ at the first time corresponding to the three-dimensional position (X1A, Y1A, Z1A) is shown as (X1A×f/Z1A, Y1A×f/Z1A). Similarly, the position of the projected image $6B_1$ of the ball 6 on the two-dimensional image $1A_1$ at the first time corresponding to the three-dimensional position (X1B, Y1B, Z1B) is shown as (X1B×f/Z1B, Y1B×f/Z1B).

The control section 12 controls the CG data storing section 16 to output the CG data (image data for the balls 5 and 6) stored in the CG data storing section 16 to the computing section 13. Then, the computing section 13 synthesizes the CG data at the obtained synthesis position.

Then, in step S5, the control section 12 sets an image identification number k to 2.

Figure 11:
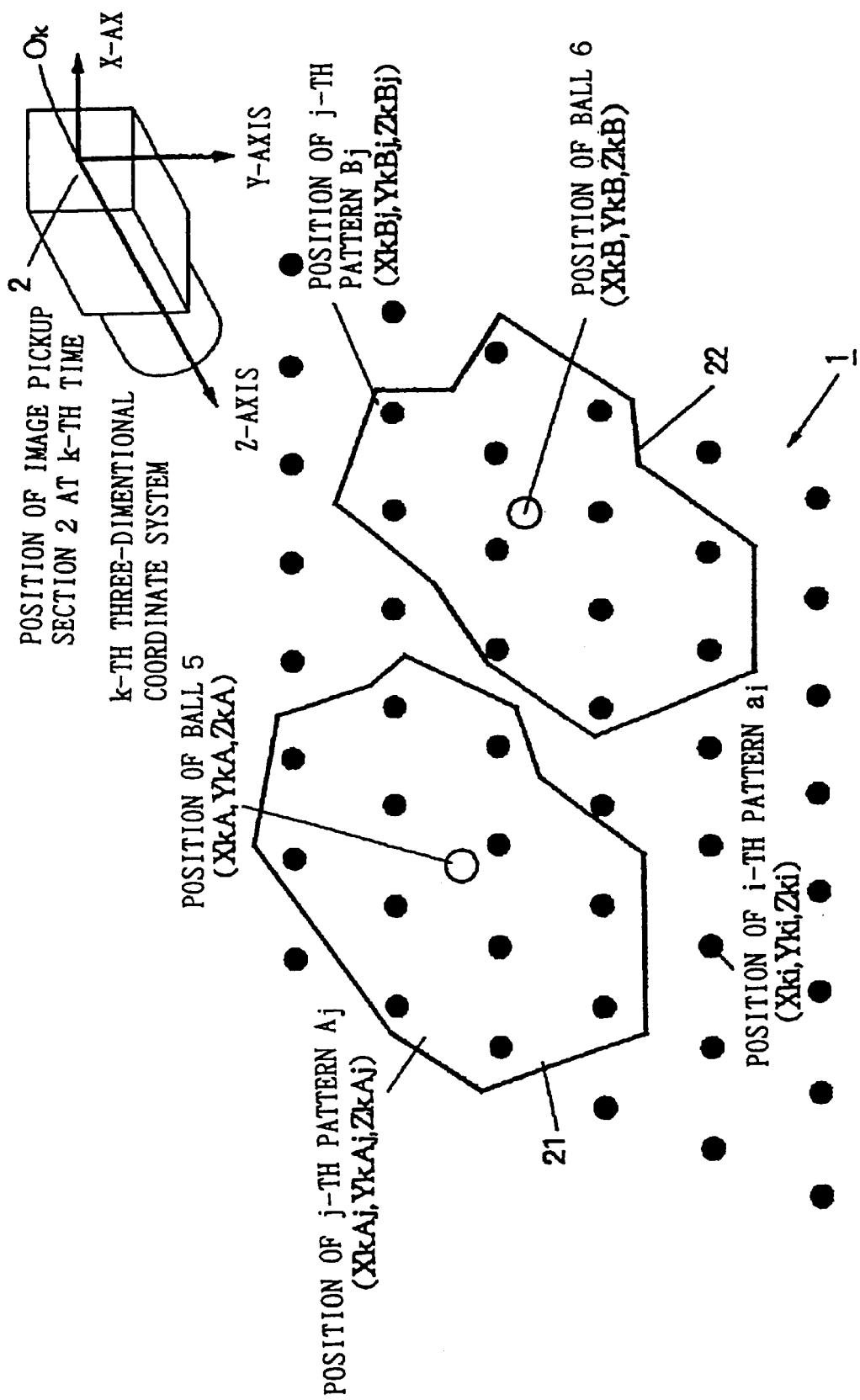
FIG. 11 is an illustration showing another positional relation between the image pickup section 2 and the plate 1 of the embodiment in FIG. 8.

As shown in FIG. 11, it is assumed that the position of the image pickup section 2 at the k-th time is an origin $O_k$, and the horizontal direction, vertical direction, and depth direction of the image pickup section 2 are X-axis, Y-axis, and Z-axis. In step S6, the computing section 13 obtains the three-dimensional position (Xki, Yki, Zki) of the pattern ai (characteristic point) at the k-th (in this case, k=2) image $1A_k$. The method for obtaining the position of the pattern ai is the same as the method for obtaining the position of the pattern ai of the first image $1A_1$.

As described above, because the patterns ai on the plate 1 can be separated from each other, it is possible to identify that patterns (nearby patterns) Aj and Bj (j=1, . . . , 12) in the (k−1)-th three-dimensional coordinate system restored by the (k−1)-th (in this case, 1st) image $1A_{k-1}$ correspond to which patterns Aj and Bj (j=1, . . . , 12) in the k-th three-dimensional coordinate system restored by the k-th image $1A_k$. In this case, it is assumed that the positions of the patterns Aj and Bj (j=1, . . . , 12) in the k-th three-dimensional coordinate system are (XkAj, YkAj, ZkAj) and (XkBj, YkBj, ZkBj) (j=1, . . . , 12).

The above two coordinate systems view the same patterns Aj and Bj from different angles. Therefore, in the (k−1)-th three-dimensional coordinate system, by applying predetermined rotational transform (hereafter, the transform function of the rotational transform is assumed as $R_2$) and predetermined rectilinear transform (hereafter, the transform function of the rectilinear transform is assumed as $S_2$) to each pattern Aj in the (k−1)-th three-dimensional coordinate system, it is possible to obtain the k-th three-dimensional coordinate system. Therefore, the following Equation (9) is effected for each pattern Aj.

$$(XkAj,YkAj,ZkAj)=(X(k-1)Aj,Y(k-1)Aj,Z(k-1)Aj)\cdot R_2+S_2 \quad (9)$$

Therefore, in step S7, the computing section 13 obtains the transform functions $R_2$ and $S2$ by substituting (X)(k−1)Aj, Y(k−1)Aj, Z(k−1)Aj) and (XkAj, YkAj, ZkAj) for the above Equation (9) on each pattern Aj.

Similarly, by applying predetermined rotational transform (hereafter, the transform function of the rotational transform is assumed as $R_3$) and predetermined rectilinear transform (hereafter, the transform function of the rectilinear transform is assumed as $S_3$) to each pattern Bj in the (k−1)-th three-dimensional coordinate system, it is possible to obtain the k-th three-dimensional coordinate system. Therefore, the following Equation (10) is effected for each pattern Bj.

$$(XkBj,YkBj,ZkBj)=(X(k-1)Bj,Y(k-1)Bj,Z(k-1)Bj)\cdot(R_3+S_3) \quad (10)$$

Therefore, the computing section 13 obtains the transform functions $R_3$ and $S_3$ by substituting (X(k−1)Bj, Y(k−1)Bj, Z(k−1)Bj) and (XkBj, YkBj, ZkBj) for the above Equation (10) on each pattern Bj.

As described above, when restoring the positions of the patterns Aj and Bj in a three-dimensional space from two-dimensional image data picked up at a certain time, the restored position includes any error. Therefore, when using, for example, the (k−1)-th three-dimensional coordinate system as a criterion, the positions of the j-th patterns Aj and Bj are not accurately present at (X(k−1)Aj, Y(k−1)Aj, Z(k−1)Aj) and (X(k−1)Bj, Y(k−1)Bj, Z(k−1)Bj). Moreover, when using the k-th three-dimensional coordinate system as a criterion, the positions of the j-th patterns Aj and Bj are not accurately present at (XkAj, YkAj, ZkAj) and (XkBj, YkBj, ZkBj).

Therefore, the computing section 13 totalizes values obtained by squaring the magnitude of the three-dimensional vector (x4, y4, z4) in the following Equation (11) on all patterns Aj in accordance with the least-squares method to obtain (most-probable) transform functions $R_2$ and $S_2$ for minimizing the total value.

$$(x4,y4,z4)=(XkAj,YkAj,ZkAj)-\{(X(k-1)Aj, Y(k-1)Aj, Z(k-1)Aj)\cdot R_2+S_2\} \quad (11)$$

By using the transform functions $R_2$ and $S_2$ obtained as described above, in step S8, the computing section 13 obtains the three-dimensional position (XkA, YkA, ZkA) of the ball 5 at the k-th time in accordance with the following Equation (12). This position is the position in the three-dimensional coordinate system shown in FIG. 11.

$$(XkA,YkA,ZkA)=(X(k-1)A,Y(k-1)A,Z(k-1)A)\cdot R_2+S_2 \quad (12)$$

Similarly, the computing section 13 totalizes values obtained by squaring three-dimensional vector (x5, y5, z5) on all patterns Bj in accordance with the least-squares method to obtain (most-probable) transform functions $R_3$ and $S_3$ for minimizing the totalized value as shown by the following Equation (13).

$$(x5,y5,z5)=(XkBj,YkBj,ZkBj)-\{(X(k-1)Bj,Y(k-1)Bj,Z(k-1)Bj)\cdot R_3+S_3\} \quad (13)$$

By using the transform functions $R_3$ and $S3$ obtained as described above, in step S8, the computing section 13 obtains the position (XkB, YkB, ZkB) of the projected image $6B_k$ of the ball 6 at the k-th time from the following Equation (14). This position is the position in the three-dimensional coordinate system shown in FIG. 11.

$$(XkB,YkB,ZkB)=(X(k-1)B,Y(k-1)B,Z(k-1)B)\cdot R_3+S_3 \quad (14)$$

In this connection, $R_2$, $S_2$, $R_3$, and $S_3$ depend on the positional relation between the image pickup sections 2 at the (k−1)-th time and the k-th time. That is, $R_2$, $S_2$, $R_3$, and $S_3$ are functions of k, and $R_2$ equals $R_2(k)$, $S_2$ equals $S_2(k)$, $R_3$ equals $R_3(k)$, and $S_3$ equals $S_3(k)$.

Moreover, in step S9, the computing section 13 obtains three-dimensional vectors (x6, y6, z6) between the ball 5 and the pattern ai on all patterns ai in accordance with the following Equation (15) and selects 12 patterns (in the portion enclosed by the frame 21 in FIG. 11) Aj in the k-th three-dimensional coordinate system in order of magnitudes of the vectors starting with a vector having the smallest magnitude (starting with a vector closest to the ball 5) as shown by the following Equation (15).

$$(x6,y6,z6)=(Xki,Yki,Zki)-(XkA,YkA,ZkA) \quad (15)$$

Moreover, the computing section 13 obtains three-dimensional vectors (x7, y7, z7) between the ball 6 and the pattern ai on all patterns ai in accordance with the following Equation (16) and selects 12 patterns (in the portion enclosed by the frame 22 in FIG. 11) Bj in the k-th three-dimensional coordinate system in order of magnitudes of the vectors starting with a vector having the smallest magnitude (starting with a vector closest to the ball 6).

$$(x7,y7,z7)=(Xki,Yki,Zki)-(XkB,YkB,ZkB) \quad (16)$$

Then, in step S10, the computing section 13 synthesizes the projected image $5A_k$ of the ball 5 at the position of (XkA×f/ZkA, YkA×f/ZkA) by using the relation of the perspective projection transform in the k-th image $1A_k$. Moreover, when there is any object other than the projected image $5A_k$ in the k-th image $1A_k$ at the image pickup section-2 side, the computing section does not synthesize the projected image $5A_k$ if it is behind the object.

Similarly, the computing section 13 synthesizes the projected image $6B_k$ of the ball 6 at the position of (XkB×f/ZkB, YkB×f/ZkB) by using the relation of the perspective projection transform in the k-th image $1A_k$. Also in this case, when there is any object other than the projected image $6B_k$ in the k-th image $1A_k$ at the image pickup section-2 side, the computing section 13 does not synthesize the projected image $6B_k$ if it is behind the object.

Then, in step S11, the control section 12 decides whether synthesis processing is completed on the whole image data picked up by the image pickup section 2. Unless the processing is completed (for k . . . N), the control section 12 starts step S12 to increment the identification number k of an image by 1 (k=k+1), and returns to step S4 to continue the synthesis processing. When the processing is completed (for k=N), the control section 12 starts step S13 and the computing section 13 outputs the image data undergoing the synthesis processing to the reproducing section 18 to make the section 18 reproduce the data (display the data).

For example, when positional relation between the patterns ai nearby the balls 5 and 6 (for example, 10 cm separate from the balls 5 and 6) is always the same, a person senses that the balls 5 and 6 are stationary. However, even if the positional relation between the patterns ai present far from the balls 5 and 6 (for example, 100 m separate from the balls 5 and 6) changes, the person does not sense the change of the positional relation.

In the case of the present invention, a pattern nearby a synthesis position is selected without considering a pattern present far from the synthesis position (that is, a pattern not to be sensed by a person) to obtain the rotational transform and rectilinear transform for the pattern. Therefore, it is possible to synthesize an image so that the balls 5 and 6 seem to be stationary on the plate 1.

In the case of the above embodiment, the stationary balls 5 and 6 are synthesized with the plate 1. However, it is also possible to synthesize the moving balls 5 and 6 with the plate 1. In this case, it is necessary to synthesize the projected images of the balls 5 and 6 at the synthesis position of the balls 5 and 6 to be synthesized in the k-th three-dimensional coordinate system obtained in step S8 in FIG. 9 by using values obtained by adding the three-dimensional vector showing each movement at the synthesis position as new positions of the balls 5 and 6.

Moreover, in the case of the above embodiment, relatively small objects such as the balls 5 and 6 are synthesized. However, it is also possible to synthesize a large object. For example, to synthesize a large rectangular parallelepiped, by designating eight vertexes of the rectangular parallelepiped, it is possible to obtain the sides for connecting the vertexes and a plane enclosed by the sides. The rectangular parallelepiped is synthesized by assuming these eight vertexes as independent objects. Because eight points are determined in each continuous image, it is possible to synthesize the rectangular parallelepiped by connecting these points by straight lines and using the points connected by the straight lines as sides and moreover, using the range enclosed by the sides as a plane.

In the case of the above embodiment, images of the balls 5 and 6 formed through CG are synthesized. However, it is also possible to obtain the positional relation between objects (objects to be actually photographed) actually present on the plate 1. Then, the operation is described below by referring to the flowchart in FIG. 12.

Figure 13:
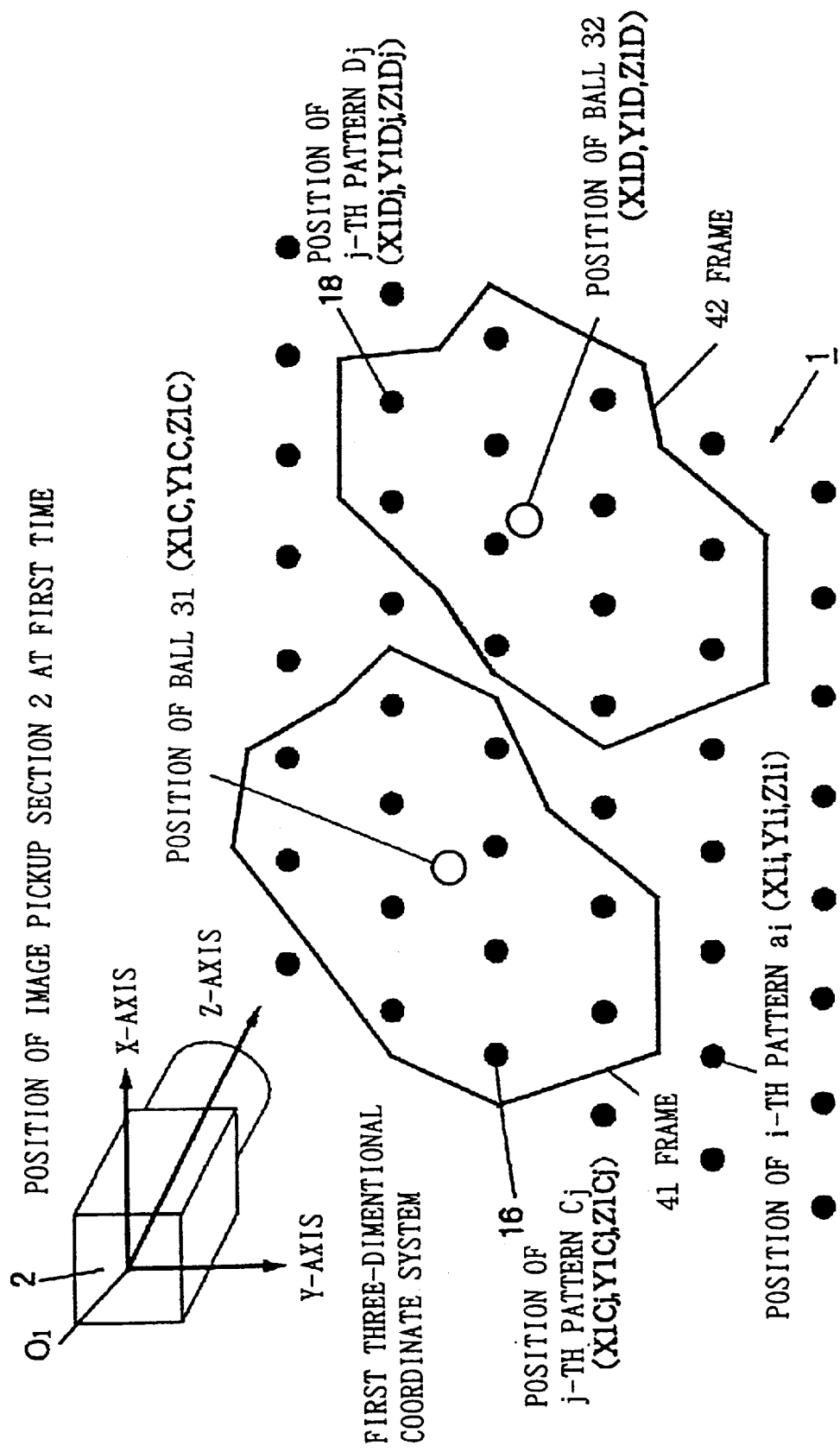
FIG. 13 is an illustration showing a positional relation between the image pickup section 2 and the plate 1 of the embodiment in FIG. 8.

As shown in FIG. 13, it is assumed that the position of the image pickup section 2 at the first time is an origin O1 and the horizontal direction, vertical direction, and depth direction of the image pickup section 2 are X-axis, Y-axis, and Z-axis. Existent balls 31 and 32 move on the plate 1. In step S31, the image pickup section 2 picks up the plate 1 while being moved by, for example, a user. Similarly to the case of the above embodiment, it is assumed that the number of images picked up by the image pickup section 2 within a pickup time is N. Moreover, identification numbers k from 1 to N are provided for these images in time series and it is assumed that the time when the k-th (k=1, . . . , N) image $1A_k$ is formed is the k-th time. Moreover, the control section 12 makes a memory 12A store the identification numbers k and uses the memory 12 as a synthesis-processing counter.

When image pickup by the image pickup section 2 is completed, the computing section 13 obtains the three-dimensional position (X1$i$, Y1$i$, Z1$i$) of every pattern (characteristic point) a$i$ on the plate 1 at the first time in step S32. Moreover, the computing section 13 obtains the three-dimensional position (X1C, Y1C, Z1C) of the ball 31 and the three-dimensional position (X1D, Y1D, Z1D) of the ball 32 at the first time in step S33.

The computing section 13 obtains three-dimensional vectors (x8, y8, z8) between the ball 31 and the pattern a$i$ on all patterns a$i$ in step S34 in accordance with the following Equation (17) and selects 12 patterns (in the portion enclosed by the frame 41 in FIG. 13) Cj in the first three-dimensional coordinate system in order of magnitudes of the vectors starting with a vector having the smallest magnitude (starting with a vector closest to the ball 31).

$$(x8,y8,z8)=(X1i,Y1i,Z1i)-(X1C,Y1C,Z1C) \quad (17)$$

Moreover, the positions of the 12 selected patterns Cj (j=1, . . . 12) are assumed as (X1Cj, Y1Cj, Z1Cj) (j=1, . . . , 12).

Similarly, the computing section 13 obtains three-dimensional vectors (x9, y9, z9) between the ball 32 and the pattern a$i$ on all patterns a$i$ in accordance with the following Equation (18) and selects 12 patterns (in the portion enclosed by the frame 42 in FIG. 13) Dj in the first three-dimensional coordinate system in order of magnitudes of the vector starting with a vector having the smallest magnitude (starting with a vector closest to the ball 32).

$$(x9,y9,z9)=(X1i,Y1i,Z1i)-(X1D,Y1D,Z1D) \quad (18)$$

Then, positions of the 12 selected patterns Dj (j=1, . . . , 12) are assumed as (X1Dj, Y1Dj, Z1Dj) (j=1, . . . , 12).

Then, in step S35, the control section 12 sets the identification number k of image data to 2.

Figure 14:
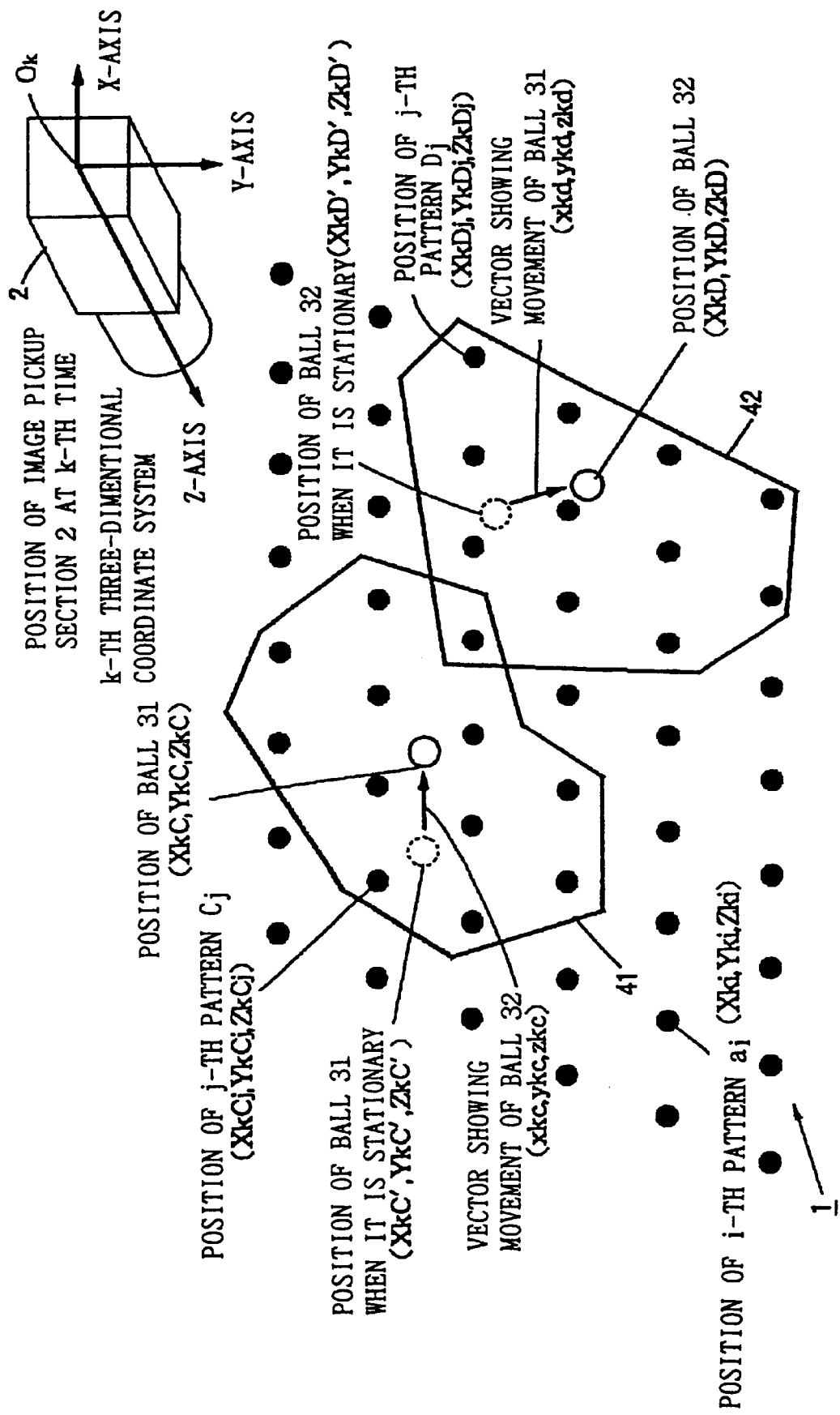
FIG. 14 is an illustration showing another positional relation between the image pickup section 2 and the plate 1 of the embodiment in FIG. 8.

Similarly, as shown in FIG. 14, it is assumed that the position of the image pickup section 2 at the k-th time (in this case, k=2) is an origin Ok, and the horizontal direction, vertical direction, and depth direction of the image pickup section 2 are X-axis, Y-axis, and Z-axis. Moreover, the computing section 13 obtains the three-dimensional position (Xk$i$, Yk$i$, Zk$i$) of the pattern a$i$ in the k-th image $1A_k$ in step S36.

As described above, the patterns a$i$ on the plate 1 can be separated from each other, it is possible to identify that the patterns Cj and Dj (j=1, . . . , 12) in the (k−1)-th three-dimensional coordinate system restored from the (k−1)-th image $1A_{k-1}$ correspond to which patterns Cj and Dj (j=1, . . . , 12) in the k-th three-dimensional coordinate system restored from the k-th image $1A_k$. In this case, positions of the patterns Cj and Dj (j=1, . . . , 12) in the k-th three-dimensional coordinate system are assumed as (XkCj, YkCj, ZkCj) and (XkDj, YkDj, ZkDj) (j=1, . . . , 12).

The computing section 13 obtains the position (XkC, YkC, ZkC) of the ball 31 and the position (XkD, YkD, ZkD) of the ball 32 at the k-th time in step S37.

By applying predetermined rotational transform (hereafter, the transform function of the rotational transform is assumed as $R_4$) and predetermined rectilinear transform (hereafter, the transform function of the rectilinear transform is assumed as $S_4$) to the pattern Cj in the (k−1)-th three-dimensional coordinate system, it is possible to obtain the k-th three-dimensional coordinate system. Moreover, to restore the position of the pattern Cj in a three-dimensional space, the computing section 13 totalizes values obtained by squaring the magnitude of three-dimensional vector (x12, y12, z12) on all patterns Cj by the least-squares method in accordance with the following Equation (19) to obtain (most-probable) transform functions $R_4$ and $S_4$ for minimizing the total value in step S38 by considering that the restored position includes any error.

$$(x12,y12,z12)=(XkCj,YkCj,ZkCj)-\{(X(k-1)Cj, Y(k-1)Cj,Z(k-1)Cj) \cdot R_4+S_4\} \quad (19)$$

The computing section 13 obtains a position (XkC', YkC', ZkC') when the ball 32 is stationary in accordance with the following Equation (20) in step S39 by using the transform functions $R_4$ and $S_4$ thus obtained.

$$(XkC',YkC',ZkC')=(X(k-1)C,Y(k-1)C,Z(k-1)C) \cdot R_4+S_4 \quad (20)$$

Therefore, the three-dimensional vector (xkc, ykc, zkc) in the following Equation (21) shows the movement of the ball 31 between the (k−1)-th time and the k-th time. This operation is performed in step S40.

$$(xkc,ykc,zkc)=(ZkC,YkC,ZkC)-(XkC',YkC',ZkC') \quad (21)$$

Similarly, by applying predetermined rotational transform (hereafter, the transform function is assumed as $R_5$) and predetermined rectilinear transform (hereafter, the transform function is assumed as $S_5$) to the pattern Dj in the (k−1)-th three-dimensional coordinate system, it is possible to obtain the k-th three-dimensional coordinate system. To restore the position of the pattern Dj in a three-dimensional space, the computing section 13 totalizes values obtained by squaring the magnitude of the three-dimensional vector (x13, y13, z13) in the following Equation (22) on all patterns Dj by the least-squares method to obtain (most-probable) transform functions $R_5$ and $S_5$ for minimizing the total value by considering that the restored position includes any error.

$$(z13, y13, z13) = (XkDj, YkDj, ZkDj) - \{(X(k-1)Dj, Y(k-1)Dj, Z(k-1)Dj) \cdot R_5 + S_5\} \quad (22)$$

The computing section 13 obtains a position (XkD', YkD', ZkD') when the ball 32 is stationary in accordance with the following Equation (23) by using the transform functions $R_5$ and $S_5$ thus obtained.

$$(XkD', YkD', ZkD') = (X(k-1)D, Y(k-1)D, Z(k-1)D) \cdot R_5 + S_5 \quad (23)$$

Therefore, it is possible to obtain the three-dimensional vector (xkd, ykd, zkd) in the following Equation (24), that is, the movement of the ball 32 between the (k−1)-th time and the k-th time.

$$(xkd, ykd, zkd) = (XkD, YkD, ZkD) - (XkD', YkD', ZkD') \quad (24)$$

Then, the computing section 13 obtains three-dimensional vectors (x10, y10, z10) between the ball 31 and the pattern ai on all patterns ai in step S41 as shown by the following Equation (25) and selects 12 patterns (in the portion enclosed by the frame 41 in FIG. 14) Cj in the k-th three-dimensional coordinate system in order of magnitudes of the vectors starting with a vector having the smallest magnitude (starting with a vector closest to the ball 31).

$$(x10, y10, z10) = (Xki, Yki, Zki) - (XkC, YkC, ZkC) \quad (25)$$

Moreover, the computing section 13 obtains three-dimensional vectors (x11, y11, z11) between the ball 32 and the pattern ai on all patterns ai as shown by the following Equation (26) and selects 12 patterns (in the portion enclosed by the frame 42 in FIG. 14) Dj in the k-th three-dimensional coordinate system in order of magnitudes of the vectors starting with a vector having the smallest magnitude (starting with a vector closest to the ball 32).

$$(x11, y11, z11) = (Xki, Yki, Zki) - (XkD, YkD, ZkD) \quad (26)$$

Then, in step S42, the control section 12 decides whether synthesis processing is completed on the whole image data picked up by the image pickup section 2. When the processing is not completed (for k . . . N), the control section 12 starts step S43 to increment the identification k of an image by 1 (k=k+1), and returns to step S36 to continue the synthesis processing. When the processing is completed (for k=N), the computing section 13 starts step S44 to make the display section 17 display movement values (xkc, ykc, zkc) and (xkd, ykd, zkd) at each time.

In the case of the above first embodiment, a characteristic point uses a two-dimensional object such as the pattern ai on the plate 1. However, it is also possible to use, for example, a side of a rectangular parallelepiped three-dimensionally arranged.

Moreover, in the case of the first embodiment, a characteristic point is selected through the operation by the computing section 13. However, it is also possible that, for example, a user selects the characteristic point by operating the input section 11 during processing.

Furthermore, in the case of the first embodiment, 12 patterns (characteristic points) Aj and Bj nearby a synthesis position are selected. However, for example, it is also possible to obtain a rotational transform function and a rectilinear transform function by selecting 20 patterns close to a synthesis position, providing a weight larger than that of 8 remaining patterns for 12 patterns closer to the synthesis position out of 20 patterns, and using the least-squares method.

The obtained rotational transform function and rectilinear transform function serve as a rotational transform function and a rectilinear transform function having a relatively large error for 8 relatively remote patterns and serve as a rotational transform function and a rectilinear transform function having a completely controlled error for the 12 patterns close enough. This is favorable because this corresponds to the human-eye characteristic of recognizing the positional relation between characteristic points separate from each other to a certain extent (the above 8 patterns) at a relatively rough accuracy and recognizing the positional relation between characteristic points close enough to each other (the above 12 patterns) at a high accuracy. Of course, the present invention does not restrict the number of characteristic points to 12 or 20.

In the case of the first embodiment, the picked up plate 1 is synthesized with CG data so as to simplify the description. Actually, however, the plate 1 is a real image photographed by a camera and a characteristic point in the plate 1 corresponds to a characteristic point such as an edge in the real image. For example, when there is a desk or wall in a photographic image, a corner of the desk or stain (dust or the like) on the wall serves as a characteristic point.

For example, it is assumed to put a vase formed through CG on a real-image desk obtained by photographing an actual room in which a real desk is present by a camera. First, it is possible to obtain three-dimensional information (characteristic point) from a corner of the desk. Moreover, a corner of a window frame of the room or a corner of a fluorescent lamp on the ceiling of the room is detected as three-dimensional information (characteristic point). Furthermore, when putting the vase formed through CG on the desk, the vase formed through CG is synthesized with the real image in accordance with the three-dimensional information obtained from a characteristic point (e.g. the corner of the desk or the like) present nearby the position where the vase is put. In this case, however, the three-dimensional information obtained from a remote characteristic point (e.g. the corner of the window frame of the room or the corner of the fluorescent lamp on the ceiling of the room) is ignored.

In the case of the above embodiment, a small ball formed through CG is synthesized with a photographic image. Moreover, to synthesize a large rectangular parallelepiped, eight vertexes of the rectangular parallelepiped are assumed as independent objects, each vertex is synthesized with a characteristic point nearby the vertex so that the positions coincide with each other, and sides and planes are synthesized at positions where these vertexes are connected by straight lines. That is, because vertexes are positioned, a person does not sense that the vertexes of the rectangular parallelepiped are displaced. However, sides and planes are not accurately positioned.

As a result, when processing a photographic image string obtained by continuously photographing a first object and thereby, generating a new photographic image string showing as if a second object is present at the string, that is, when synthesizing the second object with the original photographic image string and thereby, generating a synthesized image string, the synthesized image string may be unnatural because a synthesis position is slightly displaced in each synthesized image.

That is, when obtaining the position and attitude (direction) of an image pickup device in a three-dimensional real space and the position of a characteristic point in a three-dimensional real space at each time, these obtained values do not show true values but they include errors.

A projected image at a certain time Th is noticed. The projected position of a characteristic point when photographing the characteristic point from the obtained position and attitude (direction) of the image pickup device including errors but not showing true values at the time Th by assuming that the characteristic point is present at the position of the obtained characteristic point including errors but not showing a true value is referred to as a virtual projected position.

In fact, the position of the characteristic point appearing on a photographic image Ph photographed at the time Th is slightly displaced from the virtual projected position.

Therefore, in the case of the second embodiment to be described below, the displacement value (distortion value) is obtained. The distortion value depends on the position. Moreover, because the distortion value depends on time, it is obtained for each time. In other words, the distortion value is the function of position and time.

The position (virtual position) of the object (second object) to be synthesized is determined by an operator in accordance with the relation between the position of the second object and the position of the above obtained characteristic point.

Similarly to the case of the first embodiment, when obtaining the projected image of the second object from the obtained position and attitude (direction) of the image pickup device at the time when assuming that the second object is present at this virtual position, it is displaced from the projected position of a characteristic point in the actually-photographed photographic image Ph.

In the case of the second embodiment, the virtual position of the second object determined by the operator is distorted by a value equal to the distortion value obtained above. Moreover, the projected image of the second object is obtained by assuming that the second object is present at the distorted position. Thus, the position of the projected image of the second object coincides with that of the projected image of the characteristic point in the actually-photographed photographic image Ph.

Then, geometry about general computer vision is described below before specifically describing the second embodiment.

Figure 15:
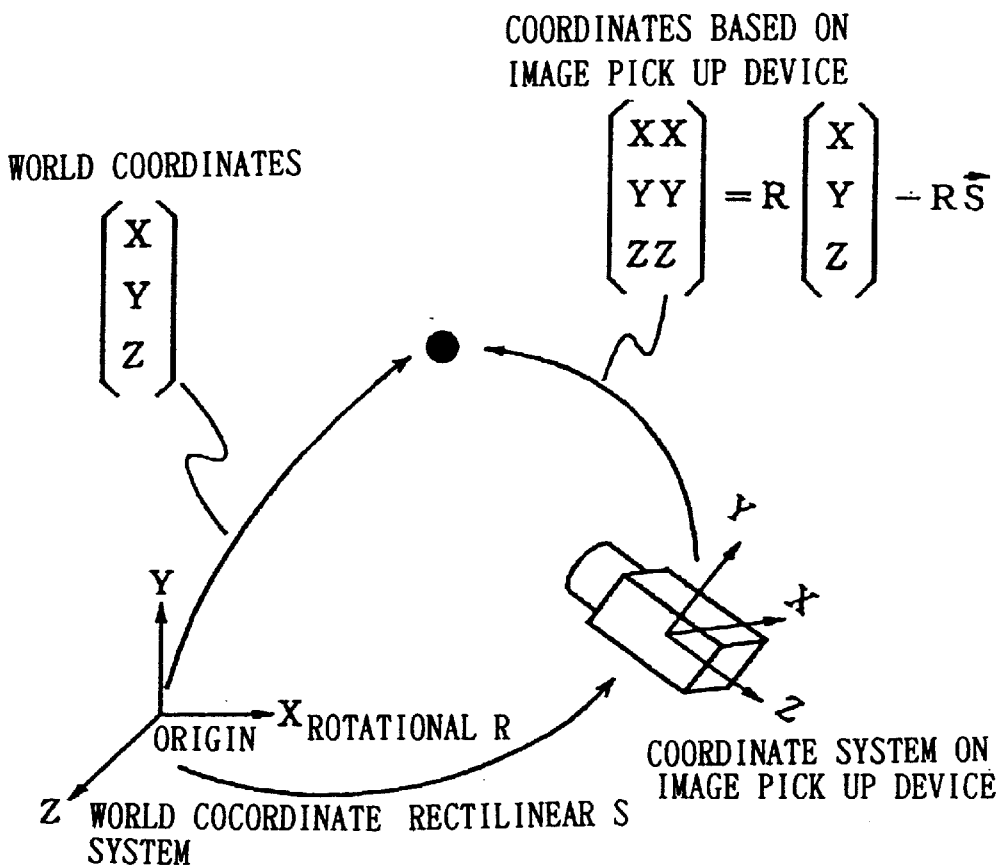
FIG. 15 is an illustration for explaining a relation between an image pickup device and a world coordinate system.

It is assumed that the position and attitude (direction) of an image pickup device (corresponding to the image pickup section 2 in FIG. 8) is present at a position moved from the origin of world coordinates due to the rotation of a matrix R and the translation of a vector S. In this case, a point at a position (X, Y, Z) on the basis of the world coordinates has coordinates (XX, YY, ZZ) shown in the following Equation (27) in the case of a coordinate system based on the above image pickup device. This state is shown in FIG. 15.

$$\begin{bmatrix} XX \\ YY \\ ZZ \end{bmatrix} = \vec{R} \begin{bmatrix} X \\ Y \\ Z \end{bmatrix} - \qquad (27)$$

$$\vec{RS} = \begin{bmatrix} R11 & R12 & R13 \\ R21 & R22 & R23 \\ R31 & R32 & R33 \end{bmatrix} \begin{bmatrix} X \\ Y \\ Z \end{bmatrix} - \begin{bmatrix} R11 & R12 & R13 \\ R21 & R22 & R23 \\ R31 & R32 & R33 \end{bmatrix} \begin{bmatrix} S1 \\ S2 \\ S3 \end{bmatrix}$$

Figure 16:
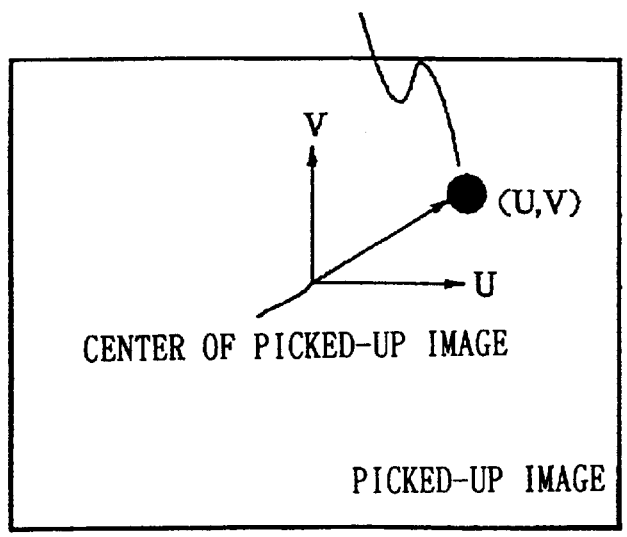
FIG. 16 is an illustration for explaining the projected image of a point based on world coordinates.

Therefore, the position (U, V) of the projected image of the above point in the photographic image photographed by the above image pickup device is shown by the following Equations (28) and (29). This state is shown in FIG. 16.

$$U = f \frac{XX}{ZZ} = f \frac{R11 \cdot X + R12 \cdot Y + R13 \cdot Z + S1'}{R31 \cdot X + R32 \cdot Y + R33 \cdot Z + S3'} \qquad (28)$$

$$V = f \frac{YY}{ZZ} = f \frac{R21 \cdot X + R22 \cdot Y + R23 \cdot Z + S2'}{R31 \cdot X + R32 \cdot Y + R33 \cdot Z + S3'} \qquad (29)$$

Where, $$\begin{bmatrix} S1' \\ S2' \\ S3' \end{bmatrix} = -\vec{RS}$$

Symbol f in the Equations (28) and (29) denotes the focal distance of the image pickup device.

Then, points in a plurality of photographic images and points in the three-dimensional real spaces are assumed.

A plurality of photographic images are obtained by performing photography while moving the image pickup device. It is assumed that photography is performed at H times such as T1, T2, T3, ..., TH. Moreover, it is assumed that a photographic image photographed at the time Th is Ph. Furthermore, it is assumed that the position and attitude (direction) of the image pickup device at the time Th is moved from the origin of the world coordinates due to rotation matrix Rh and parallel displacement vector Sh. In this case, h=1, ... H.

Furthermore, it is assumed that each of the positions of the points (J points) in the three-dimensional real spaces is (Xj, Yj, Zj) on the basis of the world coordinates. That is, it is assumed that the position of the j-th point is (Xj, Yj, Zj). In this case, j=1, ... J. Furthermore, it is assumed that each point is stationary in a three-dimensional real space.

Furthermore, it is assumed that the position of the projected image of the j-th point appearing on the photographic image Ph is (Uhj, Vhj).

Because of the same as the case of the Equations (27) to (29), the following Equations (30) to (32) are derived.

$$\begin{bmatrix} XXhj \\ YYhj \\ ZZhj \end{bmatrix} = \vec{Rh} \begin{bmatrix} Xj \\ Yj \\ Zj \end{bmatrix} - \vec{RhSh} = \begin{bmatrix} Rh11 & Rh12 & Rh13 \\ Rh21 & Rh22 & Rh23 \\ Rh31 & Rh32 & Rh33 \end{bmatrix} \begin{bmatrix} Xj \\ Yj \\ Zj \end{bmatrix} - \begin{bmatrix} Rh11 & Rh12 & Rh13 \\ Rh21 & Rh22 & Rh23 \\ Rh31 & Rh32 & Rh33 \end{bmatrix} \begin{bmatrix} Sh1 \\ Sh2 \\ Sh3 \end{bmatrix}$$

Where, j=1, . . . J, and h=1, . . . H.

$$Uhj = f\frac{Rh11 \cdot Xj + Rh12 \cdot Yj + Rh13 \cdot Zj + Sh1'}{Rh31 \cdot Xj + Rh32 \cdot Yj + Rh33 \cdot Zj + Sh3'} \quad (31)$$

$$Vhj = f\frac{Rh21 \cdot Xj + Rh22 \cdot Yj + Rh23 \cdot Zj + Sh2'}{Rh31 \cdot Xj + Rh32 \cdot Yj + Rh33 \cdot Zj + Sh3'} \quad (32)$$

Where, $$\begin{bmatrix} Sh1' \\ Sh2' \\ Sh3' \end{bmatrix} = -Rh\vec{Sh}, j = 1, \ldots, J, \text{ and } h = 1, \ldots, H.$$

In this case, (XXhj, YYhj, ZZhj) denotes the position of the j-th point on a coordinate system based on the image pickup device at the time Th.

It is assumed that the position and attitude (direction) of the image pickup device and the position (Xj, Yj, Zj) of the above point in a three-dimensional real space at each time are unknown. In this case, it is possible to obtain these unknown values from the photographic image Ph (h=1, . . . , H) at each time. That is, the position (Uhj, Vhj) of the projected image of the j-th point appearing on the: photographic image Ph can be obtained by checking the image Ph. It is possible to obtain unknown parameters (rotation matrix Rh, parallel displacement vector Sh, and Xj, Yj, Zj) by substituting the obtained position (Uhj, Vhj) for the Equations (31) and (32). Where, h=1,. . . , H, j=1, . . . , J.

When solving the Equations (31) and (32) by substituting the value: of (Uhj, Vhj) for the Equations (31) and (32), the indeterminacy of how to put the world coordinates remains. However, this is not important. For example, it is possible to make the position and attitude (direction) of the image pickup device at the first time T1 coincide with the world coordinates. In other words, it is possible to solve the Equations (31) and (32) under the condition that $R_1$ is a zero matrix and $S_1$ is a zero vector.

Moreover, in the case of an image pickup device using a wide angle lens (fish-eye lens), a photographic image taken by the device may be distorted. In this case, it is necessary to previously measure a distortion value (to previously calibrate a camera). By multiplying a distorted photographic image by the inverse number of the distortion value, it is possible to form an undistorted photographic image. Moreover, by using the above method for the undistorted photographic image, it is possible to obtain the position and attitude (direction) of the image pickup device and the position (Xj, Yj, Zj) of the above point in a three-dimensional real space at each time from the Equations (31) and (32).

By solving the Equations (31) and (32), it is possible to obtain the position and attitude (direction) of the image pickup device in a three-dimensional real space and the position of the above point in the three-dimensional real space at each time. However, these obtained values do not show true values. As described above, errors are always included in measured data in general. The position and attitude (direction) of the image pickup device and the position (Xj, Yj, Zj) of the j-th point at each time (Th) are used as unknown parameters and these unknown parameters are obtained from observed data (Uhj, Vhj) in accordance with the Equations (31) and (32). In this case, because errors are included in the observed data (Uhj, Vhj), errors are also included in the position and attitude (direction) of the image pickup device in a three-dimensional real space and the position of the above point in the three-dimensional real space obtained by solving the Equations (31) and (32).

Figure 17:
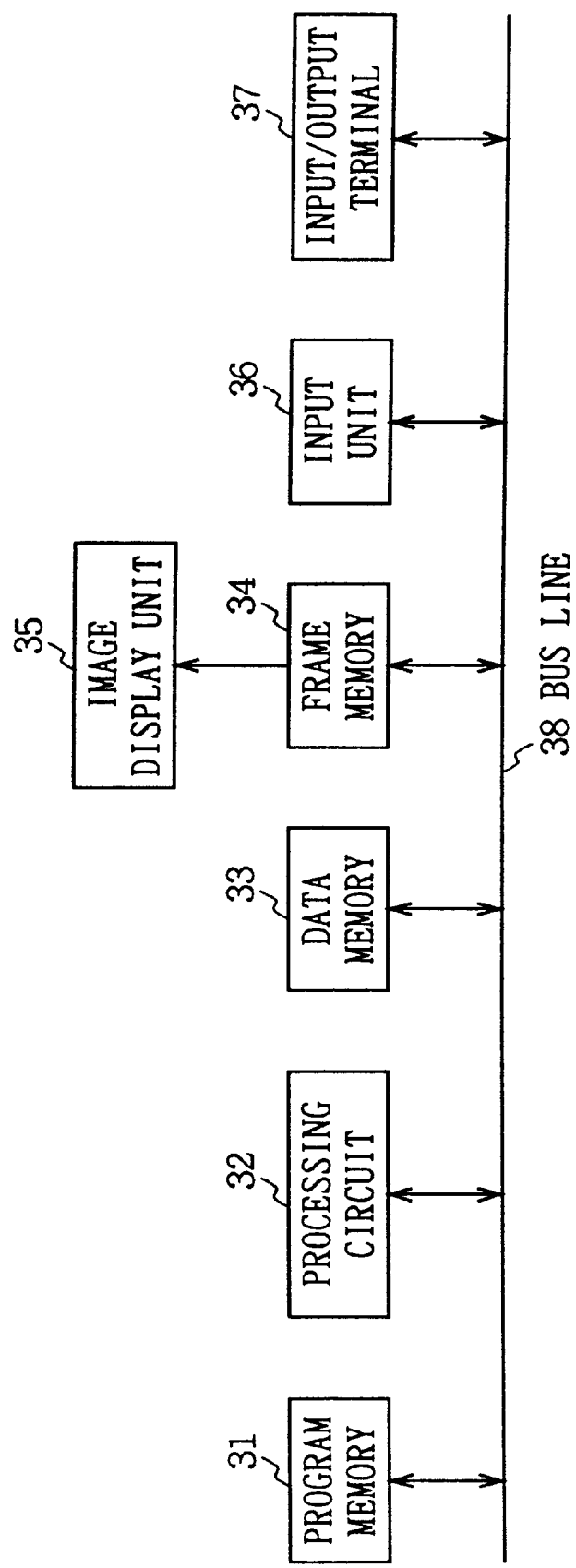
FIG. 17 is a block diagram showing the structure of the second embodiment of an image synthesizing apparatus of the present invention.

FIG. 17 shows an example of the structure of the image synthesizing apparatus of the second embodiment. In FIG. 17, a processing circuit 32 performs various types of operations in accordance with a program stored in a program memory 31. A data memory 33 is a memory for storing the data currently processed by the processing circuit 32. A frame memory 34 stores the image data to be displayed on an image display unit 35. An input unit 36 is constituted with, for example, a keyboard and a mouse and operated to input various commands. An input/output terminal 37 is connected with a not-illustrated external unit to transfer data. A bus line 38 is a bus for connecting these units each other.

Figure 18:
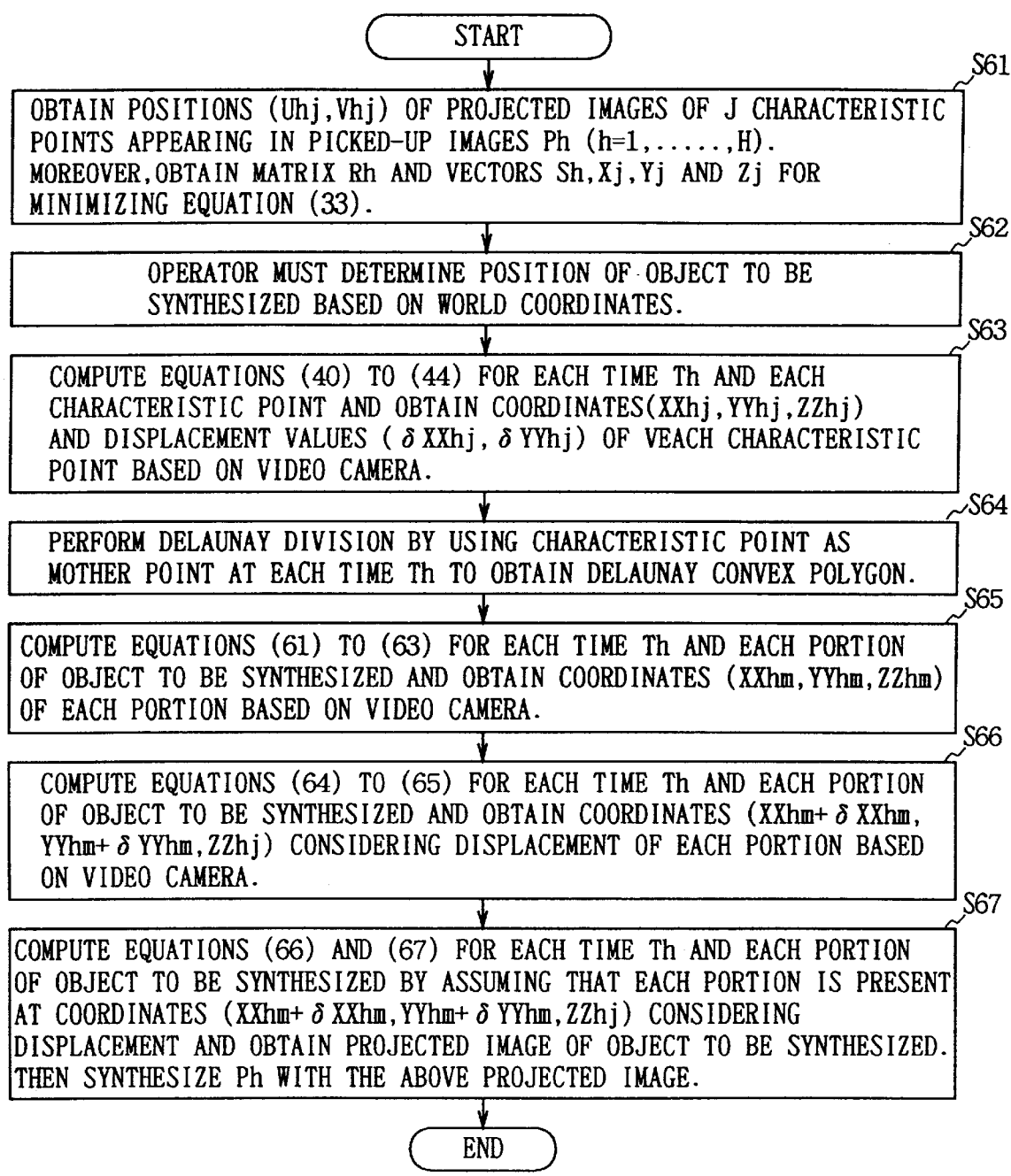
FIG. 18 is a flowchart for explaining an operation of the embodiment in FIG. 17.

Then, operations of the image synthesizing apparatus of the second embodiment are described below by referring to the flowchart in FIG. 18. The processing in FIG. 18 is mainly performed by the processing circuit 32.

Figure 19:
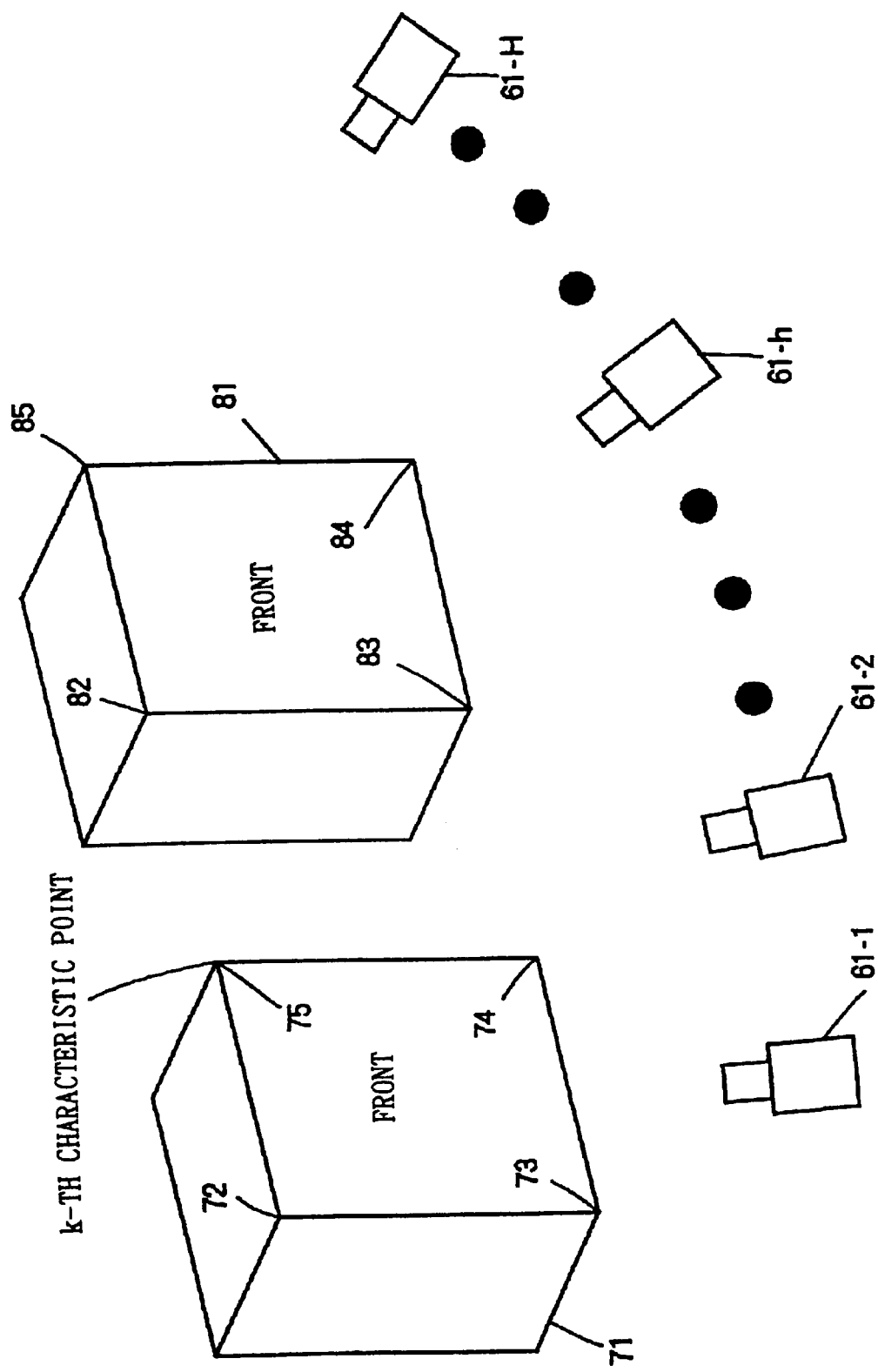
FIG. 19 is an illustration for explaining the processing for picking up an object with an image pickup device.

It is assumed to put (synthesize) a building (second object: shown as a building 91 in FIG. 20) formed through CG between two real buildings (first objects: shown as a building 71 and a building 81 in FIG. 19). Then, in step S61, the above two real buildings (first objects) are photographed while moving a video camera (image pickup device). The image data for the two buildings is stored in the data memory 33 through the bus line 38 from the input/output terminal 37. In this case, because the position of the projected image of a building in each photographic image moves with passage of time, it is also necessary to displace the position of the projected image of the building (second object) to be synthesized in the photographic image. This state is shown in FIGS. 19 to 23.

That is, as shown in FIG. 19, it is assumed that the position of the video camera (image pickup device) is 61-1 at the first time T1. At the next time T2, the video camera moves to the position 61-2. Similarly, at the time Th (h=3, 4, . . . , H), the position of the video camera moves to 61-h. Thereby, the above two real buildings (first objects) 71 and 81 are picked up. It is the final object to synthesize the second object (building 91) between the buildings 71 and 81, that is, obtain the same synthesized image as the photographic image just obtained by photographing the three buildings 71, 91, and 81 shown in FIG. 20 while moving the video camera from the position 61-1 to the position 61-H.

Figure 21:
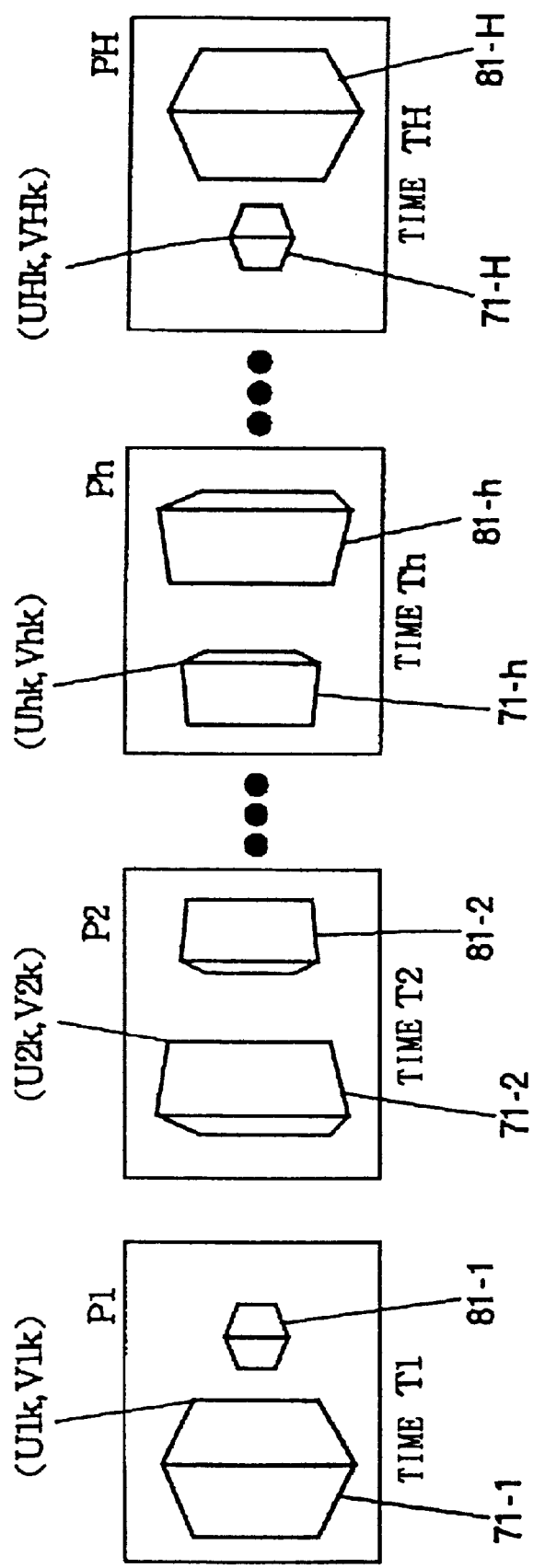
FIG. 21 is an illustration for explaining the change of an actually picked-up image.

FIG. 21 shows photographic images P1, P2, . . . , Ph, . . . , PH taken by the video camera at the times T1, T2, . . . , Th, . . . , TH. Symbols 71-1, 71-2, . . . , 71-h, . . . , 71-H denote projected images of the above real building 71 at various times. Symbols 81-1, 81-2, . . . , 81-h, . . . , 81-H denote projected images of the above real building 81 at various times.

Then, the position and attitude (direction) of the video camera in a three-dimensional real space and positions of J characteristic points (first characteristic points) of the first objects 71 and 81 in the three-dimensional real space when photographing each photographic image Ph (FIG. 21) at each time are obtained. As described above, a characteristic point is a point at which brightness or color suddenly changes. For example, a characteristic point is a corner of a rectangular parallelepiped (e.g. building) or black point on a white plane (e.g. black dust attached to white wall). Specifically, corners 72 to 75 and 82 to 85 of the buildings 71 and 81 in FIG. 19 are first characteristic points. In this connection, the plane enclosed by the corners 72 to 75 is the front of the building 71 and the plane enclosed by the corners 82 to 85 is the front of the building 81.

That is, the position (U1j, V1j) of the projected image of the j-th characteristic point is obtained out of the first characteristic points (total of J characteristic points) appearing on the photographic image P1 at the time T1. Moreover, the position (U2j, V2j) of the projected image of the j-th characteristic point is obtained out of the first characteristic points appearing on the photographic image P2 at the time T2. Similarly, the position (Uhj, Vhj) of the projected image of the j-th characteristic point is obtained out of the first characteristic points appearing on the photographic image Ph at the time Th (h=3, ... , H).

Furthermore, rotation matrix Rh, parallel displacement vector Sh, and (Xj, Yj, Zj) are obtained for h=1, ... , H and j=1, ... , J by substituting the position (Uhj, Vhj) for the following Equation (33). The obtained data is stored in the data memory 33.

[Equation 33]

$$\sum_{h=1}^{H} \sum_{j=1}^{J} \left\{ \left[ Uhj - f \frac{Rh11 \cdot Xj + Rh12 \cdot Yj + Rh13 \cdot Zj + Sh1'}{Rh31 \cdot Xj + Rh32 \cdot Yj + Rh33 \cdot Zj + Sh3'} \right]^2 \right. \quad (33)$$

$$+ \left. \left[ Vhj - f \frac{Rh21 \cdot Xj + Rh22 \cdot Yj + Rh23 \cdot Zj + Sh2'}{Rh31 \cdot Xj + Rh32 \cdot Yj + Rh33 \cdot Zj + Sh3'} \right]^2 \right\}$$

Where, $$\begin{bmatrix} R11 & R12 & R13 \\ R21 & R22 & R23 \\ R31 & R32 & R33 \end{bmatrix} = Rh, \begin{bmatrix} Sh1' \\ Sh2' \\ Sh3' \end{bmatrix} = -Rh\vec{Sh}$$

The obtained rotation matrix Rh and parallel displacement vector Sh show the position and attitude (direction) of the video camera at the time Th based on the world coordinates. The obtained (Xj, Yj, Zj) shows the position of the j-th characteristic point based on the world coordinates.

Thus, it is possible to obtain the position and attitude (direction) of the video camera in a three-dimensional real space and positions of the characteristic points (first characteristic points) of the buildings 71 and 81 serving as first object in the three-dimensional real space when photographing each of the photographic images Ph (FIG. 21) at each time Th.

It is assumed that the corner 75 (FIG. 19) which is one of the first characteristic points corresponds to the k-th characteristic point. Symbol k denotes any numerical value of 1 to J. In accordance with the processing in step S61, the position (Xk, Yk, Zk) of the k-th characteristic point based on the world coordinates is obtained. Of course, the position does not show a true value but errors are included. In this connection the corner 75 is the corner at the front top right of the real building 71.

Moreover, the photographic image Ph at the time Th is a photographic image photographed when the video camera is moved from the origin of the world coordinates due to the rotation of the matrix Rh and the translation of the vector Sh. Therefore, the matrix Rh and the vector Sh are also obtained. Of course, the above states {position and attitude (direction) shown by the rotation matrix Rh and parallel displacement vector Sh} do not show true values but errors are included.

Thus, because the positions of the two real buildings (first objects) 71 and 81 in a three-dimensional real space are obtained through the processing in step S61, the data for the position (Xj, Yj, Zj) is supplied to an image display unit 35 through the frame memory 34 and displayed in step S62. By viewing the indication, an operator (person performing the synthesis operation) designates a position to which the building (second object) 91 formed through CG (position in a virtual three-dimensional real space) is set by operating the input unit 36. The operator determines the above operation while considering the positions of the two real buildings (first objects) 71 and 81 in a three-dimensional real space. The determined positions are stored in the data memory 33.

Figure 20:
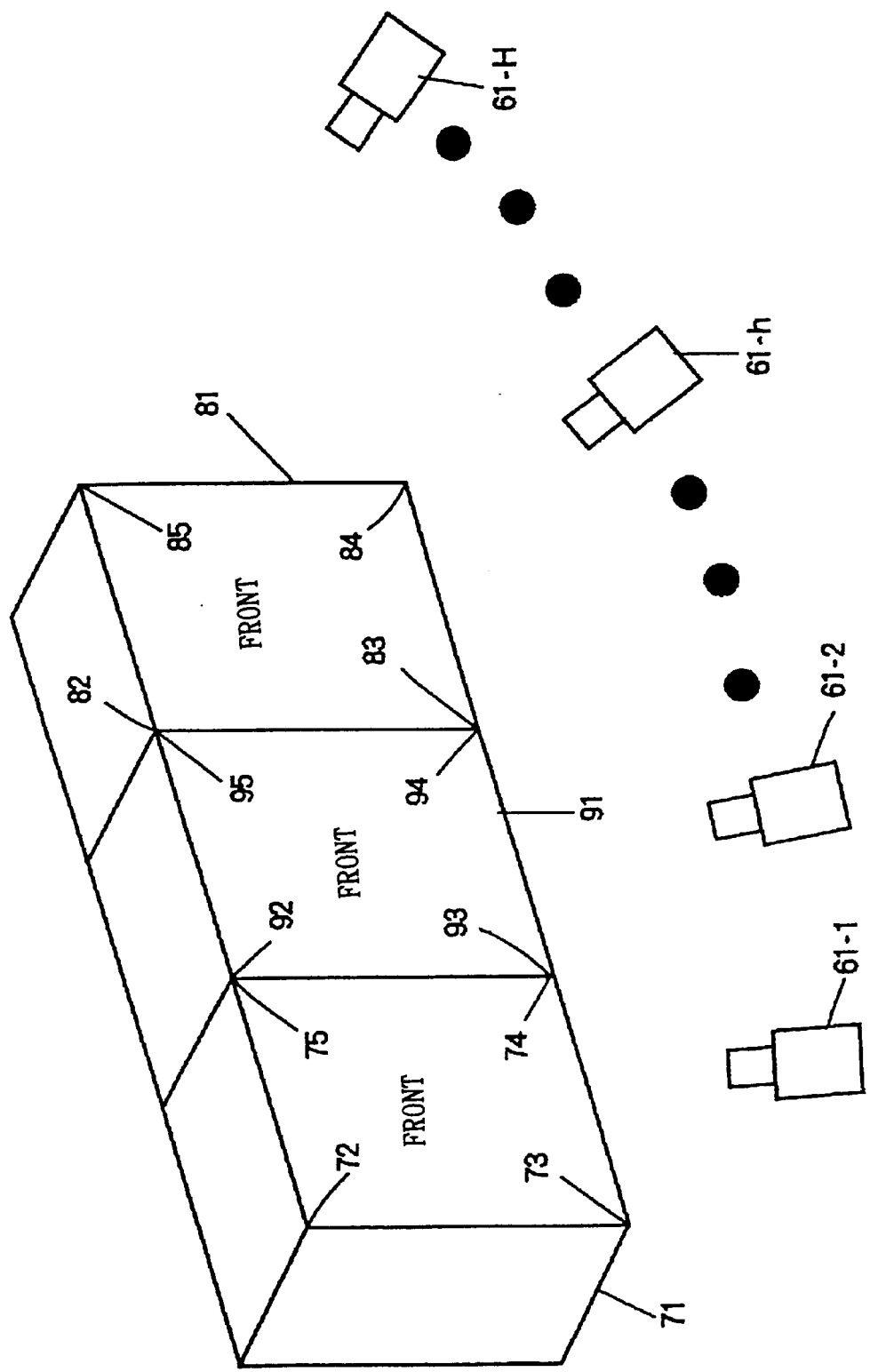
FIG. 20 is an illustration showing an example of synthesizing a CG image with an actually picked-up image.

Specifically, as shown in FIG. 20, because the positions of the corners 72 to 75 and the corners 82 to 85 serving as first characteristic points are obtained in the world coordinates, the building (second object) 91 formed through CG is put between the positions. That is, it is necessary to set the building (second object) 91 formed through CG so that the plane enclosed by the corners 75, 74, 83, and 82 serves as the front of the building (second object) 91 formed through CG (so that the top left corner 92 and the bottom left corner 93 of the building 91 correspond to the top right corner 75 and the bottom right corner 74 of the building 71 and the top right corner 95 and bottom right corner 94 of the building 91 correspond to the top left corner 82 and the bottom left corner 83 of the building 81). Thus, the position of the building (second object) 91 formed through CG is determined.

That is, the building (second object) 91 formed through CG is virtually set so that the front top left of the building (second object) 91 formed through CG is brought to the position (Xk, Yk, Zk) based on the world coordinates (FIG. 20). In other words, the front top left position of the building (second object) 91 formed through CG is (Xk, Yk, Zk). In this connection, the position (Xk, Yk, Zk) is the position of the corner 75 serving as the k-th characteristic point. Thereby, the real building 71 and the building (second object) 91 formed through CG are set so that the front top right of the building 71 contacts the front top left of the building 91.

Then, the corner 75 (k-th characteristic point) which is one of the first characteristic points is considered below. The photographic image Ph at the time Th includes the projected image of the corner 75 which is the k-th characteristic point. The position of the projected image is shown as (Uhk, Vhk) Therefore, the following Equations (34) and (35) are effected.

$$Uhk \neq f(Rh11 \cdot Xk + Rh12 \cdot Yk + Rh13 \cdot Zk + Sh1')/(Rh31 \cdot Xk + Rh32 \cdot Yk + Rh33Zk + Sh3') \quad (34)$$

$$Vhk \neq f(Rh21 \cdot Xk + Rh22Yk + Rh23 \cdot Zk + Sh2')/(Rh31 \cdot Xk + Rh32 \cdot Yk + Rh33 \cdot Zk + Sh3') \quad (35)$$

In this case, Rh, Sh, Xk, Yk, and Zk are values obtained by minimizing the Equation (33). The right and left sides of the Equations (34) and (35) have almost equal values. As previously described however, they are not strictly equal to each other. However, the position (UUhk, VVhk) of the projected image at the front top left of the building 91 completely meets the following Equations (36) and (37).

$$UUhk = f \frac{Rh11 \cdot Xk + Rh12 \cdot Yk + Rh13 \cdot Zk + Sh1'}{Rh31 \cdot Xk + Rh32 \cdot Yk + Rh33 \cdot Zk + Sh3'} \quad (36)$$

$$VVhk = f \frac{Rh21 \cdot Xk + Rh22 \cdot Yk + Rh23 \cdot Zk + Sh2'}{Rh31 \cdot Xk + Rh32 \cdot Yk + Rh33 \cdot Zk + Sh3'} \quad (37)$$

Where, $$\begin{bmatrix} R11 & R12 & R13 \\ R21 & R22 & R23 \\ R31 & R32 & R33 \end{bmatrix} = Rh, \begin{bmatrix} Sh1' \\ Sh2' \\ Sh3' \end{bmatrix} = -Rh\overline{Sh}$$

Figure 22:
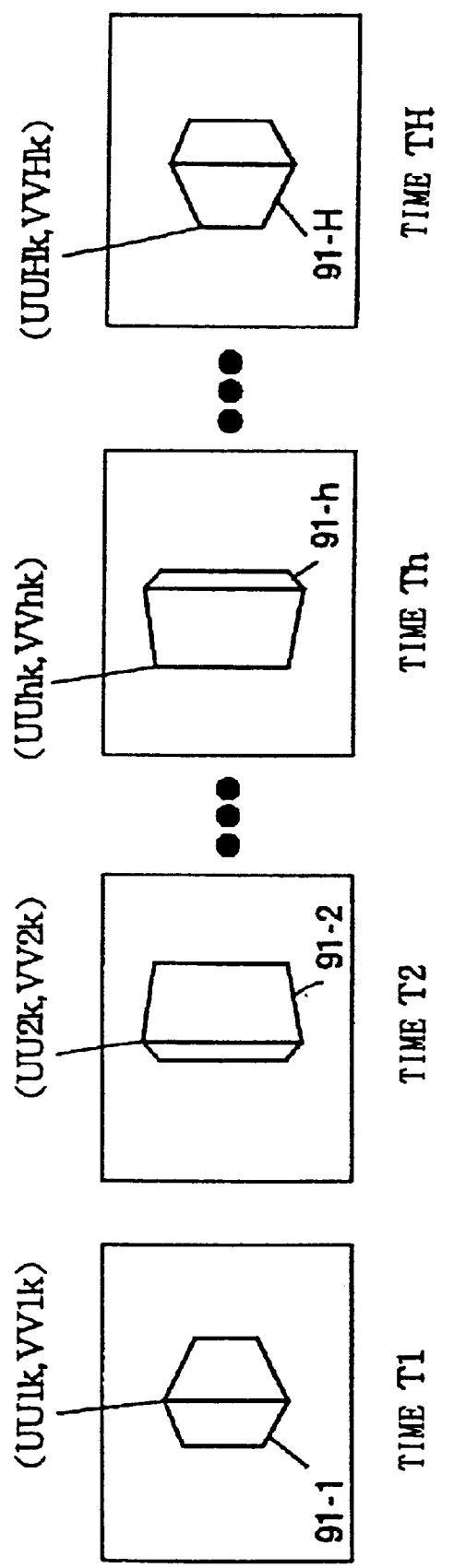
FIG. 22 is an illustration for explaining the change of CG images.

That is, as shown in FIG. 22, it is considered to photograph the building (second object) 91 formed through CG with the video camera by assuming that the front top left of the building 91 is present at the position (Xk, Yk, Zk) based on the world coordinates. The position and attitude (direction) of the video camera are shown by the rotation matrix Rh and parallel displacement vector Sh at the time Th. Therefore, the position of the projected image at the front top left of the building 91 results in the position (UUhk, VVhk) in the photographic image at the time Th shown by the Equations (36) and (37). Where, h=1, . . . , H.

As a result, (Uhk, Vhk) is not equal to (UUhk, VVhk). This Equation represents the following.

It is assumed that an operator arranges the real building 71 and the building 91 formed through CG so that the front top right of the building 71 contacts the front top left of the building 91, forms the projected image of the virtual building 91, and synthesizes an actually-photographed photographic image. The projected image at the front top right of the building 71 at the time Th is located at (Uhk, Vhk) (FIG. 21). Moreover, the projected image at the front top left of the artificially-formed building 91 is located at (UUhk, VVhk) (FIG. 22). Therefore, the projected image at the front top right of the real building 71 at the time Th does not coincide with the projected image at the front top left of the virtual building 91. When a person views the synthesized image of them, he does not sense that the state is photographed in which the front top right of the real building 71 contacts the front top left of the building 91 formed through CG.

Moreover, it is not guaranteed that the difference between the right and left sides of the Equations (34) and (35) is constant every time Th. Therefore, when a person continuously views an image synthesized every time, he feels as if the interval between the front top right of the real building 71 and the front top left of the building 91 formed through CG swings.

Figure 23:
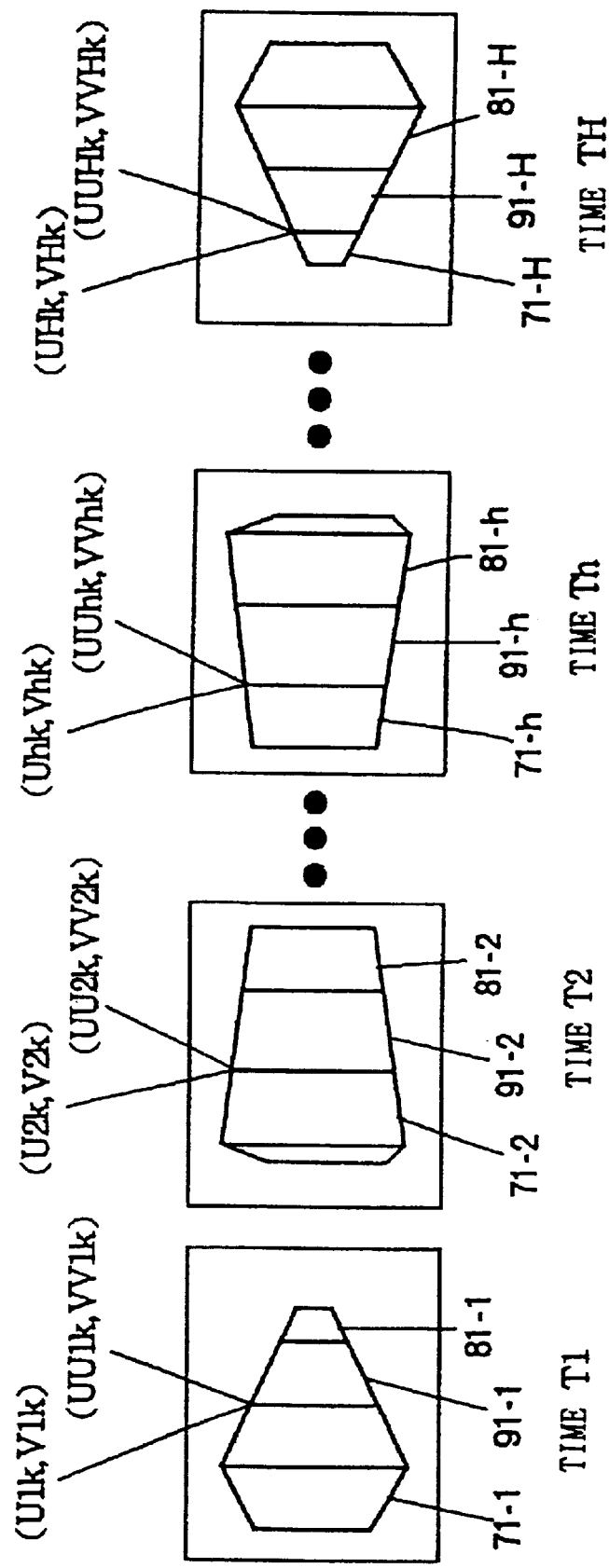
FIG. 23 is an illustration for explaining the change of a synthesized image of a pick-up image with a CG image.

Because FIG. 23 shows synthesized images under an ideal state free from errors, (Uhk, Vhk) is equal to (UUhk, VVhk). In fact, however, (Uhk, Vhk) is not equal to (UUhk, VVhk).

Therefore, the Rh, Sh, Xj, Yj, and Zj obtained in step S61 and the position (Uhj, Vhj) of the projected image of the j-th characteristic point in the photographic image Ph do not completely meet the Equations (31) and (32). That is, the following Equations (38) and (39) are effected. Where, h=1, . . . , H, j=1, . . . , J.

$$Uhj \neq f \frac{Rh11 \cdot Xj + Rh12 \cdot Yj + Rh13 \cdot Zj + Sh1'}{Rh31 \cdot Xj + Rh32 \cdot Yj + Rh33 \cdot Zj + Sh3'} \quad (38)$$

$$Vhj \neq f \frac{Rh21 \cdot Xj + Rh22 \cdot Yj + Rh23 \cdot Zj + Sh2'}{Rh31 \cdot Xj + Rh32 \cdot Yj + Rh33 \cdot Zj + Sh3'} \quad (39)$$

Where, $$\begin{bmatrix} R11 & R12 & R13 \\ R21 & R22 & R23 \\ R31 & R32 & R33 \end{bmatrix} = Rh, \begin{bmatrix} Sh1' \\ Sh2' \\ Sh3' \end{bmatrix} = -Rh\overline{Sh}$$

Thus, the processing circuit 32 reads each time Th and the data for characteristic points from the data memory 33 in step S63, computes the following Equations (40) to (44) for the time Th and the characteristic point data, obtains the coordinates (XXhj, YYhj, ZZhj) and the displacement value ($\delta$XXhj, $\delta$YYhj) of each characteristic point based on the video camera, and stores the coordinates and displacement value in the data memory 33.

$$XXhj=Rh11 \cdot Xj+Rh12 \cdot Yj+Rh13 \cdot Zj+Sh1' \quad (40)$$

$$YYhj=Rh21 \cdot Xj+Rh22 \cdot Yj+Rh23 \cdot Zj+Sh2' \quad (41)$$

$$ZZhj+Rh31 \cdot Xj+Rh32 \cdot Yj+Rh33 \cdot Zj+Sh3' \quad (42)$$

Where $$\begin{bmatrix} R11 & R12 & R13 \\ R21 & R22 & R23 \\ R31 & R32 & R33 \end{bmatrix} = Rh, \begin{bmatrix} Sh1' \\ Sh2' \\ Sh3' \end{bmatrix} = -Rh\overline{Sh}$$

$$\delta XXhj=(Uhj \cdot ZZhj)/f-XXhj \quad (43)$$

$$\delta YYhj=(Vhj \cdot ZZhj)/f-YYhj \quad (44)$$

That is, the position (X, Y, Z) based on the world coordinates is transformed into the position (XXh, YYh, ZZh) in a coordinate system based on the video camera at the time Th in accordance with the transform formulas shown in the following Equations (45) to (47).

$$XXh=Rh11 \cdot X+Rh12 \cdot Y+Rh13 \cdot Z+Sh1' \quad (45)$$

$$YYh=Rh21 \cdot X+Rh22 \cdot Y+Rh23 \cdot Z+Sh2' \quad (46)$$

$$ZZh=Rh31 \cdot X+Rh32 \cdot Y+Rh33 \cdot Z+Sh3' \quad (47)$$

The point located at (XXh, YYh, ZZh) is projected on the position (f·XXh/ZZh, f·YYh/ZZh) in the photographic image Ph.

Figure 12:
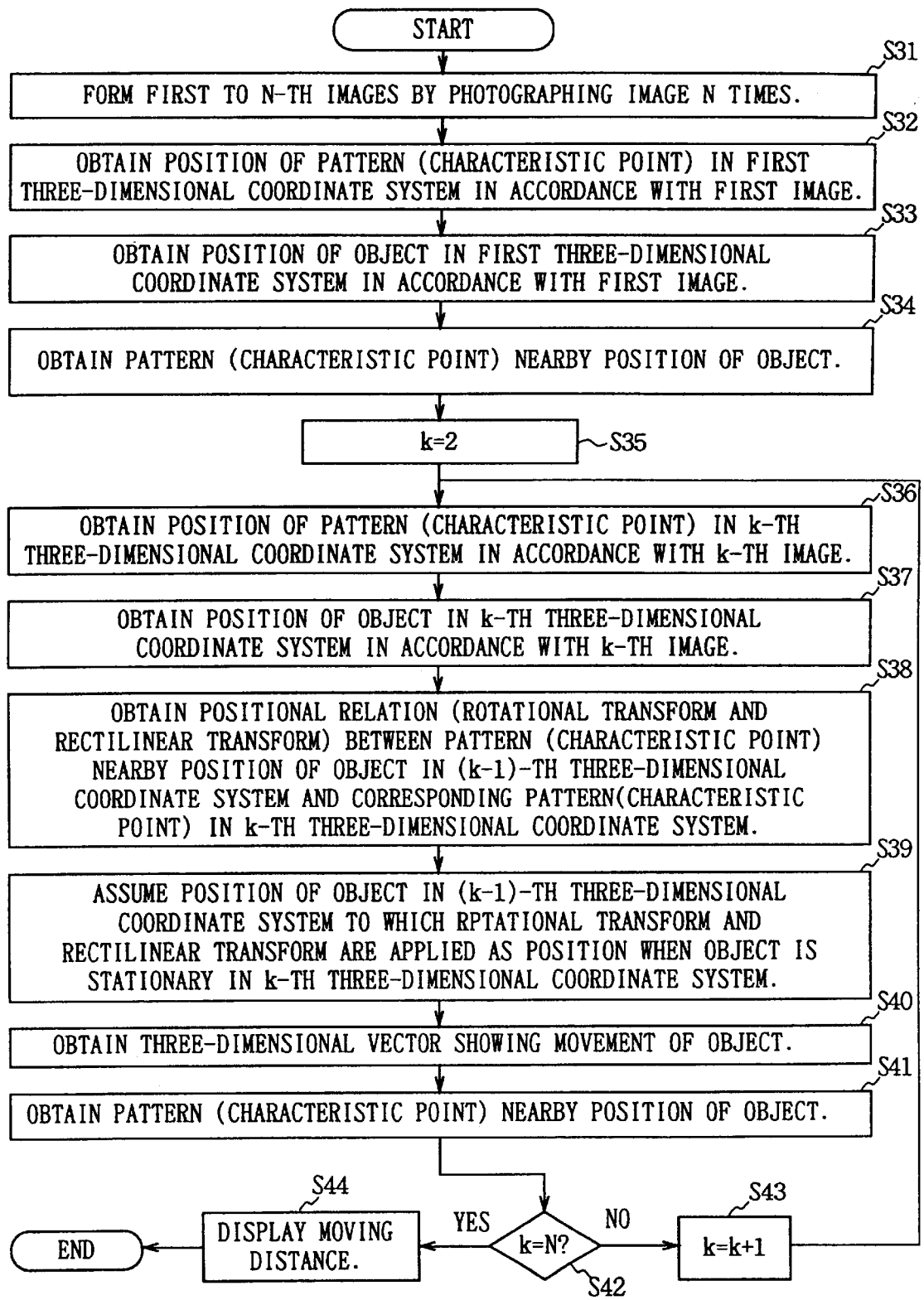
FIG. 12 is a flowchart for explaining another operation of the embodiment in FIG. 8.

The corner 75 (k-th characteristic point) shown in FIG. 12 is considered below. The position of the characteristic point becomes the position (XXhk, YYhk, ZZhk) shown by the following Equations (48) to (50) in the coordinate system based on the video camera at the time Th.

$$XXhk=Rh11 \cdot Xk+Rh12 \cdot Yk+Rh13 \cdot Zk+Sh1' \quad (48)$$

$$YYhk=Rh21 \cdot Xk+Rh22 \cdot Yk+Rh23 \cdot Zk+Sh2' \quad (49)$$

$$ZZhk=Rh31 \cdot Xk+Rh32 \cdot Yk+Rh33 \cdot Zk+Sh3' \quad (50)$$

Therefore, if an ideal photographing state free from errors is set, the position (XXhk, YYhk, ZZhk) and the position (Uhk, Vhk) of the projected image of the k-th characteristic point in the photographic image Ph have the relation between the following Equations (51) and (52)

$$Uhk=f(XXhk/ZZhk) \quad (51)$$

$$VhK=f(YYhk/ZZhk) \quad (52)$$

However, because errors are actually present, the equal signs shown in the Equations (51) and (52) are not effected. That is, errors equivalent to ($\delta$XX, $\delta$YY) shown in the following Equations (53) and (54) are produced.

$$\delta XX=(Uhk \cdot ZZhk)/f-XXhk \quad (53)$$

$$\delta YY=(Vhk \cdot ZZhk)/f-YYhk \quad (54)$$

Therefore, the errors ($\delta$XX, $\delta$YY) are computed in accordance with the Rh, Sh, Xk, Yk, and Zk obtained in step S61, measured values (Uhk, Vhk), and the Equations (48) to (50) and the Equations (53) and (54).

It is determined in step S62 to imaginarily set the corner 92 at the front top left of the building (second object) 91 formed through CG to the position (Xk, Yk, Zk) based on the world coordinates. That is, the corner 92 is set to the position (XXhk, YYhk, ZZhk) shown by the Equations (48) to (50) in the coordinate system based on the video camera at the time Th. The corner 92 is projected on the positon (UUhk, VVhk) shown by the following Equations (55) and (56) in the photographic image at the time Th.

$$UUhk = f(XXhk/ZZhk) \tag{55}$$

$$VVhk = f(YYhk/ZZhk) \tag{56}$$

In this connection, the Equations (48) to (50) and the Equations (55) and (56) are equivalent to the Equations (36) and (37). The position (UUhk, VVhk) shown by the Equations (55) and (56) is different from the position (Uhk, Vhk) of the projected image of the k-th actual characteristic point. This is a positional displacement becoming a problem.

Therefore, in the case of the second embodiment, the portion of the building (second object) 91 formed through the CG shown by the position (XXhk, YYhk, ZZhk) in the coordinate system based on the video camera at the time Th is displaced by the value shown by the Equations (53) and (54) before forming the projected image of the second object. That is, it is determined in step S62 to set the corner 92 at the front top left of the building 91 to the position (XXhk, YYhk, ZZhk) in the coordinate system based on the video camera at the time Th. However, the position is displaced by the value shown by the Equations (53) and (54) so that it is brought to (XXhk+δXX, YYhk+δYY, ZZhk). Thus, by displacing the position of the corner 92 at the front top left of the building 91, the position of the projected image of the corner 92 at the front top left of the artificially-formed building 91 at the time Th is brought to the position shown by the following Equations (57) and (58).

$$UUhk = f(XXhk + \delta XX)/XXhk \tag{57}$$

$$VVhk = f(YYhk + \delta YY)/ZZhk \tag{58}$$

The position (UUhk, VVhk) is just the same as the position (Uhk, Vhk) of the projected image of the corner 75 (k-th characteristic point) because the following Equations (59) and (60) are effected.

$$\begin{aligned} UUhk &= f(XXhk + \delta XX)/ZZhk) \\ &= f\{XXhk + (Uhk \cdot ZZhk/f) - XXhk\}/ZZhk \\ &= Uhk \end{aligned} \tag{59}$$

$$\begin{aligned} VVhk &= f(YYhk + \delta YY)/ZZhk) \\ &= f\{YYhk + (Vhk \cdot ZZhk/f) - YYhk\}/ZZhk \\ &= Vhk \end{aligned} \tag{60}$$

In short, it is decided in step S61 that the k-th characteristic point is present at the position (Xk, Yk, Zk) based on the world coordinates. This position is the position (XXhk, YYhk, ZZhk) shown by the Equations (48) to (50) in the coordinate system based on the video camera at the time Th. This value is displaced by (δXX, δYY) shown by the Equations (53) and (54) from the position (Uhk, Vhk) of the projected image of the k-th characteristic point projected on the photographic image Ph at the time Th in a three-dimensional real space. Therefore, to set the object (corner 92 at the front top left of the building 91) to be synthesized to the position (XXhk, YYhk, ZZhk) in the coordinate system based on the video camera at the time Th, a projected image is formed by assuming that the projected image is present at a position displaced by (δXX, δYY). Thereby, the position of the projected image coincides with that of the projected image of the actually-photographed object (corner 75 at the front top right of the building 71).

In the case of the above specific example, the corner 75 (k-th characteristic point) is described. The same is true for characteristic points other than the k-th characteristic point. In the case of an object (or a part of the object) to be synthesized present at a position just coinciding with the first characteristic points (first, . . . , j-th characteristic points), it is necessary to compute (δXX, δYY) which is the displacement value (distortion value) of a corresponding characteristic point and form the projected image of the object by assuming that the projected image is present at a position displaced by (δXX, δYY), as described above.

However, when the first characteristic points are not present at the position of the object (or a part of the object) to be synthesized, it is necessary to obtain the displacement value (distortion value) (δXX, δYY) through interpolation from a nearby first characteristic point.

Therefore, in step S64, the processing circuit 32 reads the characteristic point (XXhj, YYhj, ZZhj) at each time Th from the data memory 33, performs Delaunay division by using the characteristic point as a mother point, obtains a Delaunay convex polygon, and stores the polygon in the data memory 33.

That is, the position of the j-th characteristic point in the coordinate system based on the video camera at the time Th is assumed as (XXhj, YYhj, ZZhj). This position can be obtained from the Equations (40) to (42) by using the Rh, Sh, Xj, Yj, and Zj obtained in step S61.

Then, the displacement value (distortion value) (δXXhj, δYYhj) at (XXhj, YYhj, ZZhj) is obtained by using the Equations (43) and (44). In this case, the suffix h and j are attached to clarify that XX, YY, and ZZ depend on the time Th and the j-th characteristic point out of the first characteristic points. Computation of the Equations (43) and (44) is performed by substituting values obtained from the Equations (40) to (42) for XXhj, YYhj, and ZZhj and moreover, substituting a value measured from the actual photographic image Ph for Uhj and Vhj.

Obtaining the displacement value (distortion value) (δXX, δYY) at every position (XX, YY, ZZ) through interpolation represents the fact of obtaining the displacement value (distortion value) at any position under the condition that the displacement value (distortion value) at (XXhj, YYhj, ZZhj) which is the position of the j-th characteristic point is (δXXhj, δYYhj). In this case, j=1, . . . , J. Moreover, the position in the three-dimensional real spacem described here represents a coordinate system based on the video camera at the time Th.

To perform interpolation, the Delaunay division is first performed in a three-dimensional real space. That is, division of Voronoi region is performed by assuming J characteristic points as mother points to perform the Delaunay division having a dual relation with the division of the Voronoi region. Each Delaunay-divided region forms a convex polygon using mother points (that is, first characteristic points) as vertexes. Because an optional point (XX, YY, ZZ) in a three-dimensional real space is included in a Delaunay convex polygon (Delaunay-divided region), values obtained by weighting and averaging the displacement values (distortion value) (δXXhj, δYYhj) of the vertexes of the Delaunay convex polygon (first characteristic points in which the displacement values (distortion values) are already obtained) so as to be inversely proportional to the distance from the point (XX, YY, ZZ) up to each vertex of the polygon is used as the displacement value (distortion value) of the point (XX, YY, ZZ). Thus, it is possible to obtain the displacement value (distortion value) at a position other than J first characteristic points.

The Voronoi region and Delaunay division are described in detail in the description part (p. 1064) of computation geometry of "GENDAI SURIKAGAKU JITEN (transliterated)(issued by Maruzen Co., Ltd.)."

Thus, in steps S63 and S64, the displacement value (distortion value) at each of J first characteristic points is first obtained in accordance with the Equations (40) to (44) by using the Rh, sh, Xj, Yj, and Zj obtained in step S61 and the measured values (Uhk, Vhk). Then, the Delaunay convex polygon is obtained by assuming J characteristic points as mother points. For each position in each Delaunay convex polygon, the displacement value (distortion value) is obtained by weighting and averaging the above-obtained displacement values (distortion values) of vertexes (that is, first characteristic points).

In this connection, the displacement value (distortion value) depends on the time Th and moreover, depends on a position in a three-dimensional real space. That is, the displacement value (distortion value) is the function of Th and also, the function of the position (XX, YY, ZZ) in the coordinate system based on the video camera. The relation of the displacement value (distortion value) between the Th and (XX, YY, ZZ) is obtained in steps S63 and S64. Steps S63 and S64 are computation steps for obtaining the displacement value (distortion value) of each point in a three-dimensional real space at each time.

It is important for the computation steps for obtaining the displacement value (distortion value) of each point to obtain the displacement value (distortion value) at an optional point under the condition that the displacement value (distortion value) at (XXhj, YYhj, ZZhj) which is the position of the j-th characteristic point is equal to ($\delta$XXhj, $\delta$YYhj). It is also possible to use other method instead of the Delaunay division under the above condition.

In step S62, a position (virtual position based on world coordinates) to which the building (second object) 91 formed through CG is set is obtained. Moreover, in step S61, the rotation matrix Rh and parallel displacement vector Sh showing the position and attitude (direction) of the video camera at each time Th (h=1, . . . , H) are obtained.

Therefore, in step S65, the processing circuit 32 reads world-coordinates-based virtual positions (Xm, Ym, Zm) of all the points (assumed as M points) constituting the building (second object) 91 formed through CG from the data memory 3, applies the rotation matrix Rh and parallel displacement vector Sh also read from the data memory 33 to the virtual positions, obtains the position (XXhm, YYhm, ZZhm) shown by the coordinate system based on the video camera at the time Th,. and stores the position (XXhm, YYhm, ZZhm) in the data memory 33. In this case, m=1, . . . , M. That is, the following Equations (61) to (63) are computed.

$$XXhm = Rh11 \cdot Xm + Rh12 \cdot Ym + Rh13 \cdot Zm + Sh1' \quad (61)$$

$$YYhm = Rh21 \cdot Xm + Rh22 \cdot Ym + Rh23 \cdot Zm + Sh2' \quad (62)$$

$$ZZhm = Rh31 \cdot Xm + Rh32 \cdot Ym + Rh33 \cdot Zm + Sh3' \quad (63)$$

Then, in step S66, the processing circuit 32 obtains the displacement value (distortion value) ($\delta$XXhm, $\delta$YYhm) obtained in steps S63 and S64 and corresponding to the position (XXhm, YYhm, ZZhm) obtained from the Equations (61) to (63) in accordance with the following Equations (64) and (65).

$$\delta XXhm = \frac{\sum_j \frac{\delta XXhj}{\text{DISTANCE BETWEEN } (XXhm, YYhm, ZZhm) \text{ AND } (XXhj, YYhj, ZZhj)}}{\sum_j \frac{1}{\text{DISTANCE BETWEEN } (XXhm, YYhm, ZZhm) \text{ AND } (XXhj, YYhj, ZZhj)}} \quad (64)$$

$$\delta YYhm = \frac{\sum_j \frac{\delta YYhj}{\text{DISTANCE BETWEEN } (XXhm, YYhm, ZZhm) \text{ AND } (XXhj, YYhj, ZZhj)}}{\sum_j \frac{1}{\text{DISTANCE BETWEEN } (XXhm, YYhm, ZZhm) \text{ AND } (XXhj, YYhj, ZZhj)}} \quad (65)$$

Then, the ($\delta$XXhm, $\delta$YYhm) is added to (XXhm, YYhm, ZZhm). The added position (XXhm+$\delta$XXhm, YYhm+$\delta$YYhm, ZZhm) serves as the final position of the m-th point constituting the building (second object) 91 formed through CG. Of course, the position is the coordinate system based on the video camera at the time Th.

Then, the position (UUhm, VVhm) of the projected image of the m-th point constituting the building(second object) 91 formed through CG is obtained. That is, the following Equations (66) and (67) are computed.

$$UUhm + f(XXhm + \delta XXhm)/ZZhm) \quad (66)$$

$$VVhm + f(YYhm + \delta YYhm)/ZZhm) \quad (67)$$

The Equations (61) to (63) and the Equations (66) and (67) are computed on every m=1, . . . , M. Thereby, it is possible to compute the projected image of the building (second object) 91 formed through CG.

In the case of this embodiment, the displacement value ($\delta$XXhj, $\delta$YYhj) is obtained in accordance with the Equations (40) to (44) by assuming that a displacement value is present only in the directions of a two-dimensional plane (X, Y) based on the video camera. However, it is also possible to assume that a displacement value is present in Z direction. That is, it is possible to assume the minimum value of ($\delta$XXhj, $\delta$YYhj, $\delta$ZZhj) meeting the following Equations (68) and (69) as a displacement value.

$$Uhj = f(XXhj + \delta XXhj)/(ZZhj + \delta ZZhj) \quad (68)$$

$$Vhj = f(YYhj + \delta YYhj)/(ZZhj + \delta ZZhj) \quad (69)$$

However, (XXhj, YYhj, ZZhj) in the above Equations can be obtained from the Equations (40) to (42). In this case, by obtaining the displacement value of an optional position under the condition that the displacement value (distortion value) at (XXhj, YYhj, ZZhj) which is the position of the j-th characteristic point is equal to ($\delta$XXhj, $\delta$YYhj, $\delta$ZZhj), it is possible to obtain the displacement value at each position. The position (UUhm, VVhm) of the projected image of the m-th point constituting the building (second object) 91 formed through CG is shown by the following Equations (70) and (71) instead of the Equations (66) and (67).

$$UUhm = f(XXhm + \delta XXhm)/(ZZhm + \delta ZZhm) \quad (70)$$

$$VVhm = f(YYhm + \delta YYhm)/(ZZhm + \delta ZZhm) \quad (71)$$

In the above Equations, ($\delta XXhm$, $\delta YYhm$, $\delta ZZhm$) denotes the displacement value (distortion value) at the position (XXhm, YYhm, ZZhm) obtained by the Equations (61) to (63).

Finally, by synthesizing the projected image of the building (second object) 91 formed through CG with the photographic image Ph, it is possible to obtain a synthesized image to be finally obtained at the time Th. By performing the above operation for all times of h=1, ..., H, it is possible to obtain synthesized images from the time T1 up to the time TH.

By using the technique of the second embodiment, a displacement value (distortion value) is added so that the virtual position of an object (second object) to be synthesized designated by an operator coincides with the position of a characteristic point of a photographic image actually photographed :at the time for each time and each position in a three-dimensional real space. Therefore, the position of a synthesized image is not displaced.

Moreover, it is possible to determine the displacement value (distortion value) at every position in a three-dimensional space and a displacement value (distortion value) is added to every portion constituting a second object without distinguishing between vertexes, sides, planes of an object (second object) to be synthesized. Therefore, there is no problem on alignment of sides and planes described in the first embodiment.

Moreover, various modifications and applications can be considered other than the above description as long as they are not deviated from the gist of the present invention. Therefore, the gist of the present invention is not restricted to synthesis of a CG image formed through CG with a plate having characteristic points but the gist includes every case related to synthesis of a CG image formed through CG with a real image.

As supply media for supplying a computer program for performing the above processing to users, it is possible to use not only recording media such as a magnetic disk, CD-ROM, and solid state memory but also communication media such as a network and satellite.

As described above, according to the image synthesizing apparatus, of claim 1, the image synthesizing method of claim 8, and the supply medium of claim 15, a coordinate transform function is obtained in accordance with a first characteristic point nearby a synthesis position for synthesizing an object and fourth coordinates on a three-dimensional coordinate system corresponding to a second image are obtained by applying the coordinate transform function to third coordinates so as to synthesize the projected image of the object at a position corresponding to the fourth coordinates of the second image. Therefore, it is possible that the projected image of the object seem to be natural in first and second images.

According to the position detecting apparatus of claim 16, the position detecting method of claim 17, and the supply medium of claim 18, a coordinate transform function is obtained in accordance with a first characteristic point nearby an object and fifth coordinates on a three-dimensional coordinate system corresponding to a second image are obtained by applying the coordinate transform function to third coordinates so as to detect the difference between the fourth and fifth coordinates. Therefore, it is possible to accurately compute the positional relation of a third image in the first and second images.

According to the image synthesizing apparatus of claim 19, the image synthesizing method of claim 21, and the supply medium of claim 23, a position to which the projected image of a second object is set is corrected in accordance with a distortion value. Therefore, it is possible to control swinging of a synthesized image.

INDUSTRIAL APPLICABILITY

An image synthesizing apparatus can be applied to the case of synthesizing a computer-graphics (CG) image with a real image photographed by a video camera.

What is claimed is:

1. An image synthesizing apparatus for synthesizing the projected image of a second object by assuming that said second object is present at a predetermined position of each of a plurality of photographic images on which a first object photographed by an image pickup device is photographed, the apparatus comprising:

image-pickup-device-position computing means for computing the most-probable position of said image pickup device when photographing each of said photographic images;

characteristic point position computing means for computing the most-probable position of a characteristic point of said first object;

virtual projected position computing means for computing a virtual projected position on which the most-probable position of said characteristic point is projected when performing photography by using said image pickup device present at said most-probable position;

distortion value computing means for computing a distortion value in accordance with the difference between said virtual projected position and the position of the projected image of said characteristic point actually photographed on each of said photographic images;

correcting means for correcting a position to which the projected image of said second object is set in accordance with the distortion value computed by said distortion value computing means;

projected image computing means for computing the projected image of said second object when photographing said second object from said image pickup device at the most-probable position by assuming that said second object is present at the position corrected by said correcting means; and synthesizing means for synthesizing the projected image of said second object computed by said projected image computing means with each of said photographic images.

2. The image synthesizing apparatus according to claim 1, wherein said distortion value computing means computes said distortion value through interpolation in accordance with said characteristic point.

3. An image synthesizing method for synthesizing the projected image of a second object with each of a plurality of photographic images on which a first object is photographed by an image pickup device by assuming that said second object is present at a predetermined position, the method comprising:

the image-pickup-device-position computing step for computing the most-probably position of said image pickup device when photographing each of said photographic images;

the characteristic point position computing step of computing the most-probable position of a characteristic point of said first object;

the virtual projected position computing step for computing a virtual projected position on which the most-probable position of said characteristic point is projected when performing photography using said image pickup device set at said most-probable position;

the distortion value computing step of computing a distortion value in accordance with the difference between said virtual projected position and the position of the projected image of said characteristic point actually photographed on each of said photographic images;

the correcting step of correcting a position to which the projected image of said second object is set in accordance with the distortion value computed by said distortion value computing step;

the projected image computing step for computing the projected image of said second object when photographing said second object from said pickup device at the most-probable position by assuming that said second object is located at the position corrected in said correcting step; and the synthesizing step of synthesizing the projected image of said second object computed in said projected image computing step with each of said photographic images.

4. The image synthesizing method according to claim 3, wherein said distortion value is computed through interpolation in accordance with said characteristic point in said distortion value computing step.

5. A supply medium for supplying a computer program used for an image synthesizing apparatus for synthesizing the projected image of a second object with each of a plurality of photographic images on which a first object photographed by an image pickup device is photographed by assuming that the second object is present at a predetermined position, the computer program comprising:

the image-pickup-device-position computing step of computing the most-probable position of said image pickup device when photographing each of said photographic images;

characteristic point position computing step of computing the most-probable position of a characteristic point of said first object;

virtual projected position computing step of computing a virtual projected position to which the most-probable position of said characteristic point is projected when performing photography by using said image pickup device set at the most-probable position;

the distortion value computing step of computing a distortion value in accordance with the difference between said virtual projected position and the position of the projected image of said characteristic point actually photographed on each of said photographic images;

the correcting step of correcting a position to which the projected image of said second object is set in accordance with the distortion value computed in said distortion value computing step;

the projected image computing step of computing the projected image of said second object when photographing said second object from said image pickup device at the most-probable position by assuming that said second object is present at the position corrected in said correcting step; and synthesizing step of synthesizing the projected image of said second object computed in said projected image computing step with each of said photographic images.

* * * * *

UNITED STATES PATENT AND TRADEMARK OFFICE
CERTIFICATE OF CORRECTION

PATENT NO. : 6,404,913 B1
DATED : June 11, 2002
INVENTOR(S) : Mitsuharu Ohki

It is certified that error appears in the above-identified patent and that said Letters Patent is hereby corrected as shown below:

Column 4,
Line 46, change "claim 1" to -- an embodiment of the present invention --.

Column 6,
Line 50, change "claim 1" to -- an embodiment of the present invention --.

Column 7,
Line 10, change "claim 3" to -- an embodiment of the present invention --.
Line 35, change "claim 5" to -- an embodiment of the present invention --.

Column 9,
Lines 16 and 17, change "claim 1" to -- an embodiment of the present invention --.
Line 42, change "claim 3" to -- an embodiment of the present invention --.
Line 43, change "claim 5" to -- an embodiment of the present invention --.

Column 10,
Line 66, change "claim 1" to -- an embodiment of the present invention --.

Column 33,
Line 45, change "claim 1" to -- an embodiment of the present invention --.
Line 46, change "claim 8" to -- an embodiment of the present invention --.
Line 46, change "claim 15" to -- an embodiment of the present invention --.
Line 57, change "claim 16" to -- an embodiment of the present invention --.
Line 58, change "claim 17" to -- an embodiment of the present invention --.
Line 59, change "claim 18" to -- an embodiment of the present invention --.

UNITED STATES PATENT AND TRADEMARK OFFICE
CERTIFICATE OF CORRECTION

PATENT NO.    : 6,404,913 B1
DATED         : June 11, 2002
INVENTOR(S)   : Mitsuharu Ohki It is certified that error appears in the above-identified patent and that said Letters Patent is hereby corrected as shown below:

<u>Column 34,</u>
Lines 1 and 2, change "claim 19" to -- an embodiment of the present invention --.
Line 2, change "claim 21" to -- an embodiment of the present invention --.
Line 3, change "claim 23" to -- an embodiment of the present invention --.

Signed and Sealed this

Twenty-fifth Day of February, 2003

JAMES E. ROGAN
*Director of the United States Patent and Trademark Office*